US007693990B2

(12) United States Patent
Tsujimoto

(10) Patent No.: US 7,693,990 B2
(45) Date of Patent: Apr. 6, 2010

(54) MULTIFUNCTION DEVICE INCLUDING COMMAND CONTROL AND AUTHENTICATION, AND RECORDING MEDIUM STORING PROGRAM FOR CAUSING COMPUTER TO FUNCTION AS THE SAME

(75) Inventor: Kunihiko Tsujimoto, Yao (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 454 days.

(21) Appl. No.: 11/801,796

(22) Filed: May 10, 2007

(65) Prior Publication Data

US 2008/0022087 A1 Jan. 24, 2008

(30) Foreign Application Priority Data

May 12, 2006 (JP) .............................. 2006-134427

(51) Int. Cl.
G06F 13/00 (2006.01)
(52) U.S. Cl. .................... 709/225; 709/217; 709/250
(58) Field of Classification Search ................. 709/217, 709/219, 223, 224, 225, 250
See application file for complete search history.

(56) References Cited

U.S. PATENT DOCUMENTS

2005/0168769 A1* 8/2005 Kim et al. .................. 358/1.14

2005/0268089 A1* 12/2005 Kim et al. ................... 713/153
2006/0068759 A1 3/2006 Ikebe et al.

FOREIGN PATENT DOCUMENTS

JP 2005-215945 8/2005
JP 2006-101282 A 4/2006

* cited by examiner

*Primary Examiner*—Viet Vu
(74) *Attorney, Agent, or Firm*—Edwards Angell Palmer & Dodge LLP; David G. Conlin; David A. Tucker

(57) ABSTRACT

A multifunction device includes: a control command receiving section for receiving a control command from a control device; a criterion storage section for storing criterion in which command type information indicating control command types is associated with information indicating whether an authentication process is necessary or not; a command type determining section for determining whether the authentication process is necessary or not for the control command received by the control command receiving section; an access key checking section for performing the authentication process by matching the access key with an authentication key stored in advance, the access key checking section performing the authentication process if the access key checking section determines that the authentication process is necessary; and an Web service layer for executing a process as instructed by the control command, the Web service layer performing the process if the access key checking section that authentication is successful, or if the command type determining section determines that the authentication process is not necessary. This makes it possible to attain a multifunction device with a high security and with an ability to perform a process with a workload that is reduced as much as possible.

15 Claims, 23 Drawing Sheets

FIG. 8

| 1ST API FROM OSA APP. LAYER. | 2ND API DISCLOSED BY SERVICE LAYER (IN CALLING ORDER) | | | |
|---|---|---|---|---|
| | FIRST | SECOND | THIRD | FOURTH |
| ExecuteCopy | Do Scan | Do Print | | |
| ExecuteScan | Do Scan | SaveFile | SendByFTP | |
| ExecuteFAX | Do Scan | SaveFile | SendByLine | |
| ExecutePrint | SaveFile | DoPrint | | |
| ... | ... | ... | ... | ... |

FIG. 10

| COMMAND TYPE | AUTHENTICATION |
|---|---|
| SCAN JOB CREATE | NECESSARY |
| EXECUTE SCAN | NECESSARY |
| SCAN JOB CANCEL | NECESSARY |
| SCAN JOB CLOSE | NECESSARY |
| OPERATION SCREEN CHANGE | UNNECESSARY |
| EVENT REGISTRATION | UNNECESSARY |
| ... | ... |

FIG. 20

| APPLICATION NAME | MULTIFUNCTION DEVICE FUNCTIONS | USAGE FREQUENCY |
|---|---|---|
| DOCUMENT ADMINISTRATION APPLICATION | COPY | – |
| | SCAN | 18 |
| | FAX | 5 |
| | PRINT | 74 |
| MAP PRINTING APPLICATION | ... | ... |
| | PRINT | 31 |
| | ... | ... |

MULTIFUNCTION DEVICE INCLUDING COMMAND CONTROL AND AUTHENTICATION, AND RECORDING MEDIUM STORING PROGRAM FOR CAUSING COMPUTER TO FUNCTION AS THE SAME

This Nonprovisional application claims priority under 35 U.S.C. §119(a) on Patent Application No. 134427/2006 filed in Japan on May 12, 2006, the entire contents of which are hereby incorporated by reference.

FIELD OF THE INVENTION

The present invention relates to a multifunction device control system in which a multifunction device is connected via a communications network with control devices that control the multifunction device.

BACKGROUND OF THE INVENTION

There have been known multifunction devices each of which has plural functions such as copying, scanning, printing, and facsimile transmission. These days such a multifunction device is connected to a PC (Personal Computer) or the like via a communications network and executes various processes.

On the other hand, in a system having been proposed by the applicant of the present application, applications running on a PC cooperate with functions of a multifunction device, based on SOAP (Simple Object Access Protocol). The multifunction device can therefore operate as a part of a total application system. This makes it possible to easily construct a flexible service in which functions of a multifunction device are appropriately combined with functions of a PC (see Non-Patent Citations 1 and 2).

Meanwhile, some arts have been known, which are for performing authentication for execution of software. Patent Citation 1 describes a storage device in which authentication for execution of software by an information processing device is performed. In the storage device described in Patent Citation 1, the storage device has a license for the software. A key of cryptograph provided in the software is used to authenticate for reading the information regarding software license to create an authentication key. The execution of the software is authenticated when the created authentication key matches with a read-out authentication key.

Patent Citation 1: Japanese unexamined patent publication, Tokukai, No. 2005-215945 (published on Aug. 11, 2005)

Non-Patent Citation 1: 'Digital Color Multifunction Device.' [online]. Sharp Corporation, date unknown [searched on Apr. 4, 2006]. Retrieved from the Internet: <URL:http://www.sharp.co.jp/products/mx4501fn/text/function.html>Non-Patent Citation 3: Hisashi KOBAYASHI 'Sharp Unveiled 12 Models of Business-Oriented Digital Full-Color Multifunction Devices' [online]. ascii24.com, Nov. 24, 2005 [searched on Apr. 4, 2006]/Retrieved from the Internet:<URL : http://ascii24.com/news/i/hard/article/2005/11/24/659226-000.html>

In the case where the application running on a PC is cooperated with the function of the multifunction device, the following adverse effects would occur when the multifunction device operates according to control commands that the multifunction device receives from any kind of applications. For example, the multifunction device would print out meaningless images on many sheets. The multifunction device would operate according to a control command that requires the multifunction device to operate with conditions that the multifunction device is not supposed to be set, and would cause errors such as garbled characters, etc.

It is an option to adopt the art of Patent Citation 1 whereby authentication is performed to check whether or not a control command is from a valid application, so as to make sure safe operation of the multifunction device.

However, performing authentication for all control commands put such a high burden on the multifunction device thereby prolonging the overall processing time.

SUMMARY OF THE INVENTION

An object of the present invention is to attain a multifunction device with a high security and with an ability to perform a process with a workload that is reduced as much as possible.

To attain the object, a multifunction device according to the present invention is communicatably connected with a control device for executing an application program, the multifunction device performing a device function according to a control command created by the application program, the device function being an appropriate combination of plural elemental functions including a communication function and at least one of an image reading function and an image forming function, wherein: the control command is attached with an access key; and the multifunction device comprises: a control command receiving section for receiving the control command from the control device; a criterion storage section for storing criterion in which command type information indicating control command types is associated with information indicating whether an authentication process is necessary or not; a determining section for determining, by using the criterion, whether the authentication process is necessary or not for the control command received by the control command receiving section; an authentication process section for performing the authentication process by matching the access key with an authentication key stored in advance, the authentication process section performing the authentication process if the determining section determines that the authentication process is necessary; and a process execution section for executing a process as instructed by the control command, the process execution section performing the process if the authentication process section determines that authentication is successful, or if the determining section determines that the authentication process is not necessary.

As an alternative, a multifunction device according to the present invention is communicatably connected with (i) a control device for executing an application program, and (ii) an authentication server, the multifunction device performing a device function according to a control command created by the application program, the device function being an appropriate combination of plural elemental functions including a communication function and at least one of an image reading function and an image forming function, wherein: the control command is attached with an access key; the authentication server performs an authentication process by matching the access key with an authentication key stored in advance, and outputs authentication result information that indicates a result of the authentication process; and the multifunction device comprises: a control command receiving section for receiving the control command from an external device; a criterion storage section for storing criterion in which command type information indicating control command types is associated with information indicating whether an authentication process is necessary or not; a determining section for determining, by using the criterion, whether the authentication process is necessary or not for the control command received by the control command receiving section; an authentication result information obtaining section for transmitting the access key attached to the control command, to the authentication server if the determining section determines that the authentication process is necessary, and obtaining the authentication result information from the authentication server; and process execution section for executing a process as instructed by the control command, the process execution section performing the process if the authentication result information obtained by the authentication result information obtaining section indicates that authentication is successful, or if the determining section determines that the authentication process is not necessary.

In this arrangement, the authentication process by matching the access key with the authentication key is carried out only if a control command of the type is received, which requires the authentication process according to the criterion (determination condition) stored in the criterion storage section. The criterion may be arbitrarily set by a manufacturer of the multifunction device.

By this, the manufacturer of the multifunction device can set a control command for an image reading function and an image forming function, each of which is a main function of the multifunction device as a control of a type that requires the authentication process. This arranges that the authentication process is performed only for the control commands that control the main function of the multifunction device, while this prevents problems such as errors caused by control commands created by unauthorized application programs. This attains a higher security.

On the other hand, the manufacturer of the multifunction device can set such that a control command for controlling a non-main function of the multifunction device such as transmission of status information of the multifunction devices does not require the authentication process. By this, the workload burdened on the multifunction device can be reduced compared with the case where the authentication process is performed for all the control commands.

As described above, the above arrangements attain a multifunction device with a high security and with an ability to perform a process with a workload that is reduced as much as possible.

The access key may be predetermined by the manufacturer of the multifunction device. By this, the manufacturer of the multifunction device can grasp the application programs, which respectively store authorized access keys. As a result, the manufacturer can charge a fee on a manufacturer of an application program who request for an authorized access key.

Moreover in the arrangement where the authentication is performed by the authentication server, the multifunction device does not need to store the authentication key therein. In case a new key is provided for a new application program, it is required to store a new authentication key in the authentication server, but not to update the authentication keys in all multifunction devices.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 8 is a view illustrating one example of a command translation table stored in an open I/F layer.

FIG. 10 is a view illustrating an example of data stored in a criterion storage section.

FIG. 20 is a view illustrating an example of data stored in a usage frequency storage section.

DESCRIPTION OF THE EMBODIMENTS

Embodiment 1

One embodiment of the present invention is described below referring to FIGS. 1 to 12. In the following, one embodiment of a multifunction device control system according to the present invention is described. FIG. 2 is a view illustrating a multifunction device control system according to the present embodiment.

As illustrated in FIG. 2, the multifunction device control system according to the present embodiment includes a multifunction device 1 and a control device 2, which are connected via a communication network. Of course, the number of the multifunction device 1 included in the composition device control system may be plural, and the number of the control device 2 included in the composition device control system may be plural.

The communication network via which the multifunction device 1 and the control device 2 are connected may be the Internet, a telephone line, a serial cable, another wire line, a wireless line, or the like.

In the present embodiment, the multifunction device 1 receives a control command from the control device 2 and operates according to the control command. For control commands that are for controlling predetermined main functions (scanning function, printing function), etc., the multifunction device 1 is arranged to perform authentication to check whether the control command is valid or not. The authentication is performed with an access key attached with the control command. Only when the authentication is successful, the multifunction device operates according to the control command. This makes it possible to prevent problems (such as bugging in the main functions of the multifunction device 1 and unauthorized use of the multifunction device 1) caused by unauthorized access from an application program unauthorized by a manufacturer of the multifunction device 1.

(Hardware Arrangement of Multifunction Machine)

The multifunction device 1 is a device having plural image forming functions such as copying, scanning (image reading function), printing (image forming function), transmitting and receiving image data (communication function), image conversion, and the like. For example, the multifunction device 1 may be a device (MFP: Multifunction printer) in which a printer, a copier, a fax machine, a scanner, and an arithmetic unit for performing the image transmission and reception, image conversion, and image processing are integrated.

The multifunction device 1 may not have all the functions mentioned above. Thus, the multifunction device 1 may be such a device having the scanning function (image reading function) and the communication function, or a device having the printing function (image forming function) and the communication function.

Figure 3:
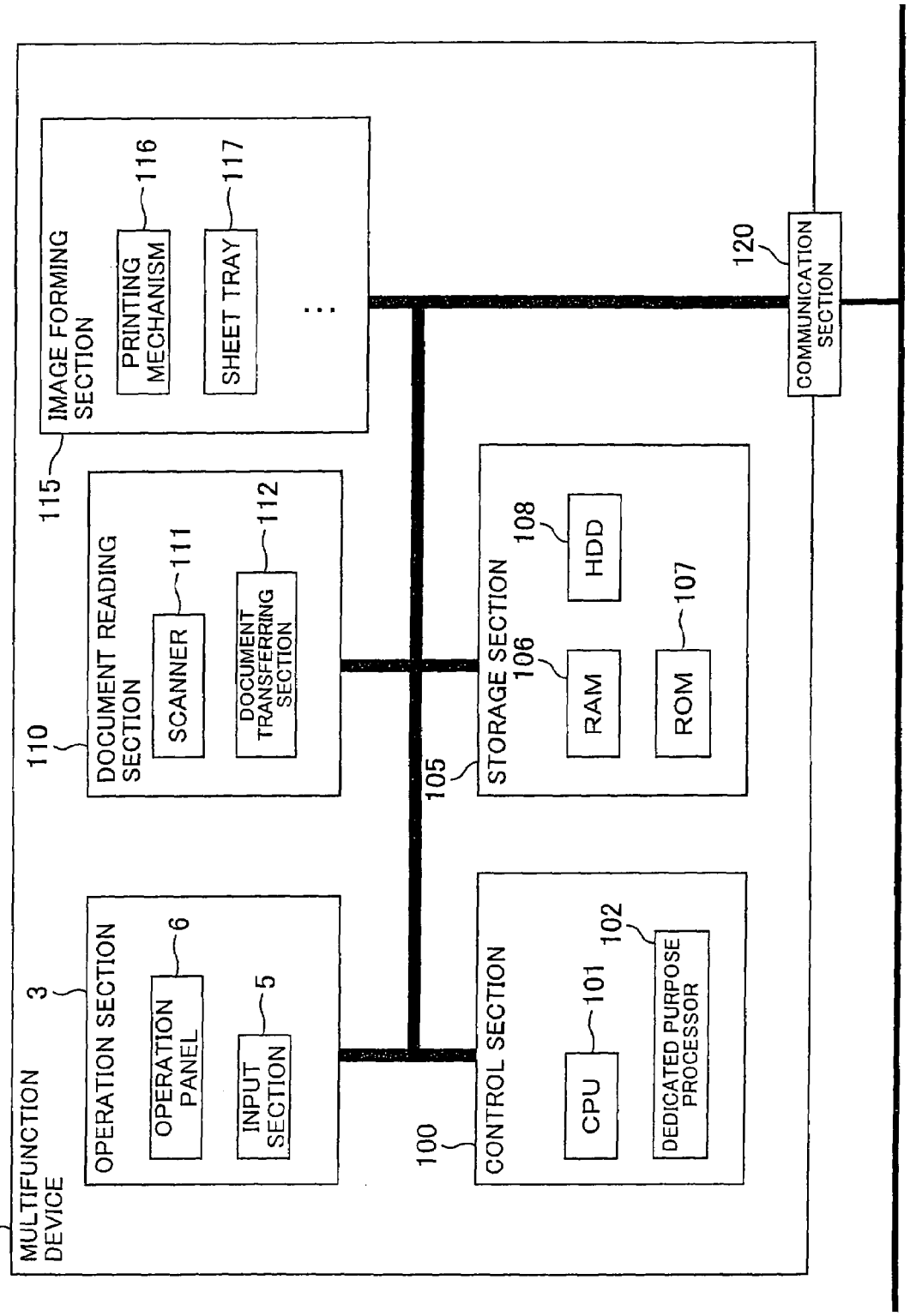
FIG. 3 is a block diagram illustrating a hardware arrangement of a multifunction device according to the present embodiment.

FIG. 3 is a block diagram illustrating a hardware arrangement of the multifunction device 1. As illustrated in FIG. 3, a multifunction device 1 includes an operating section 3, a document reading section 110, an image forming section 115, a control section 100, a storage section 105, and a communicating section 120, which are connected with each other via data buses.

The operating section 3 has a function of receiving an input from a user, and includes an operating panel 6 and an inputting section 5 later described. A document reading section 110 includes a scanner 111 and a document transferring section 112. Character, image, and the like printed on a document can be read as image data by the document reading section 110.

The image forming section 115 has a function of printing, on a sheet such as paper, an image (characters/photograph/graphics) according to input image data. The image forming section 115 includes a printing mechanism 116 and a sheet tray 117, and the like. The communication section 120 is an interface for performing communication (including fax transmission and reception) with an external device such as the control device 2, or the like.

The control section 100 includes a CPU 101 and a dedicated purpose processor 102. The storage section 105 includes a RAM 106, a ROM 107, and HDD 108.

Various functions are attained in the multifunction device 1 by running various programs on the CPU 101 of the control section 100, the programs being stored in the storage section 105. To perform the document reading process, the CPU101 runs a control program for controlling the document reading section 110. To perform the image forming (printing) process, the CPU 101 runs a control program for controlling the image forming section 115. To perform the communication process such as transmission and reception of various data, the CPU 101 runs a control program of the communication section 120.

Figure 4:
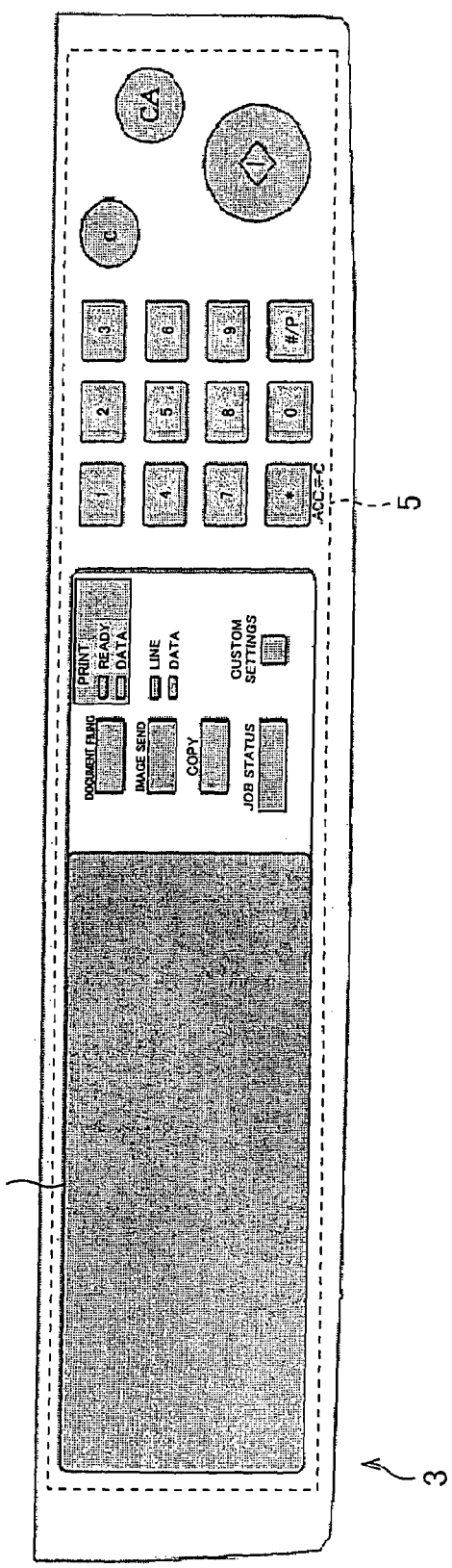
FIG. 4 is a plane view illustrating an operating section provided to the multifunction device.

FIG. 4 is an enlarged view of the operating section 3 provided to the multifunction device 1. As illustrated in FIG. 4, the operating section 3 includes an operation panel (display section) 6 for displaying an operation screen for the user, and an input section for receiving user input. Here, the operation panel 6 employs a touch panel system, and also functions as the input section 5. That is, the operation panel 6 can display various buttons.

The multifunction device 1 may be connected with a UI (user interface) apparatus instead of including the operating section 3 or in addition of including the operation section 3. In this case, The operation screen is displayed on the UI apparatus connected to the multifunction device 1.

(Hardware Configuration of Control Device)

Figure 5:
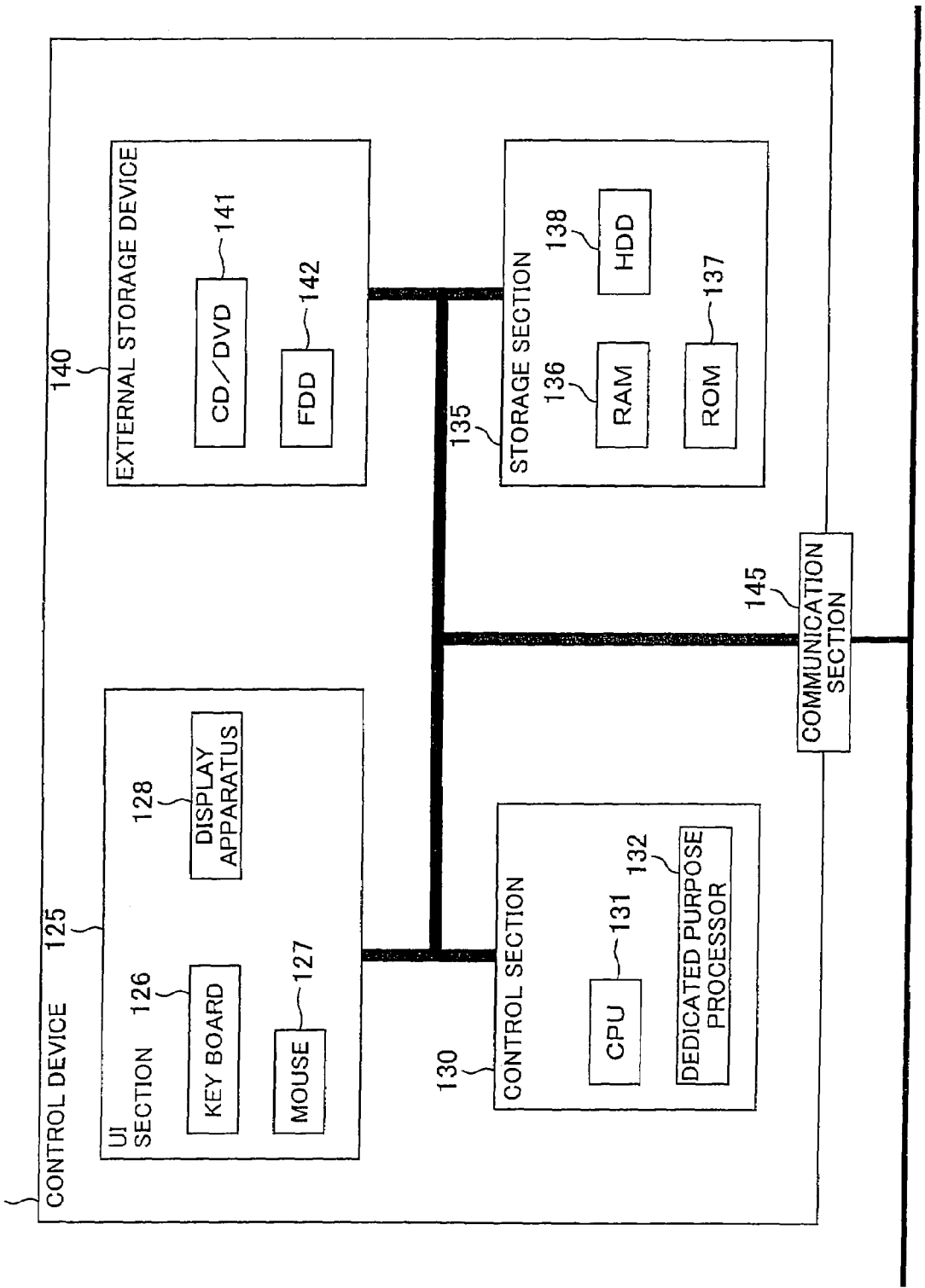
FIG. 5 is a block diagram illustrating a hardware arrangement of a control device according to the present embodiment.

FIG. 5 is a block diagram illustrating the hardware configuration of the control apparatus 2. As illustrated in FIG. 5, the control apparatus 2 is a computer, and is provided with an UI section 125, a control section 130, a storage section 135, an external storage device 140, and a communication section 145, each of which is connected with each other via data buses.

The UI section 125 has a function of receiving an input from the user and giving information to the user. For example, the UI section 125 includes a key board 126, a mouse 127, and a display apparatus 128. The communication section 145 is an interface for communicating with an external device such as the multifunction device 1.

The control section 130 includes a CPU 131 and a dedicated purpose processor 132. The storage section 135 includes a RAM 136, a ROM 137, and a HDD 138. Moreover, the external storage device 140 includes a CD or DVD 141 and a FDD 142.

Various programs are stored in the storage section 135, and execution thereof by the CPU 131 of the control section 130 realizes various functions in the control device 2. By the CPU 131 using a control program of the UI section 125, the process of receiving an input from the user and giving information to the user is executed. Moreover, by the CPU 131 executing the control program of the communication section 145, the communication process such as transmission and reception of various data is executed. Further, the control section 2 can perform various processes such as OCR (Optical Character Recognition), translation, etc. by running appropriate application programs on the CPU 131.

To the multifunction device 1, the control device 2 sends control commands for controlling various function of the multifunction device 1. Thereby, the control device 2 can enjoy one or more Web services provided by the multifunction device 1. The "Web services" are program executions that allow external usage of functions of a device via a network. This is performed by using SOAP (Simple Object Access Protocol) generally.

In order to obtain data (operation screen data) of the operation screen, the multifunction device 1 accesses the control device 2 that acts as a Web server. The multifunction device 1 displays on the operation panel 6 the operation screen data obtained from the control device 2. That is, the multifunction device 1 can communicate with the user. In this way, the multifunction device 1 can perform the display of the operation screen by requesting the control device 2 to provide the operation screen data, and does not need to administer the data of the operation screen by itself.

A multifunction device control system of the present embodiment with such an arrangement makes it possible that the control device 2 and the multifunction device 1 work in cooperation (cooperation operation). One example of such a cooperation operation of the multifunction device 1 and the control device 2 is as follows: The control device 2 extracts characters from image data obtained by scanning performed by the multifunction device 1, and translates the extracted characters from English to Japanese, and then the multifunction device 1 prints out an image including the translated characters. With this arrangement, the operation of the multifunction device 1 can be controlled by the control device 2 freely. Thus, a flexible system can be established with this arrangement.

As described below, any types of the multifunction device 1 use same APIs (Application Program Interfaces; control instructions) which are open to the outside. The control devices 2 can therefore use same control instructions for any types of multifunction device 1, and this makes it easy to develop programs embedded in the control devices 2. The API is a group of rules (functions) stipulating relations between instructions which can be used for software development and procedures executed by the respective instructions.

The multifunction device 1 and the control devices 2 use HTTP or HTTPS supporting SSL (Secure Socket Layer), for communications regarding requests/responses of operation screen data. HTTPS is suitable for improving security as compared to HTTP. Examples of markup languages used for such communications are HTML (Hypertext Markup Language), XML (eXtensible Markup Language), WML (Wireless Markup Language), and XHTML (extensible HyperText Markup Language) and/or other languages.

XML is a descriptive language with document structure, which allows data transmissions as easy as HTML. XML is advantageous in (a) that the user can define the meaning of a character string in a document, (b) not being dependent on any particular software, and (c) being easily programmable, and the like.

In the meanwhile, control instructions by which the control devices 2 control the multifunction device 1 are transmitted by means of a protocol for communications between objects. An example of such a protocol is SOAP (Simple Object Access Protocol) using a markup language such as XML. SOAP is an XML-based or HTTP-based protocol for calling data and services, and enables plural systems to cooperate one another.

The following will discuss how the control device 2 and the multifunction devices 1 are arranged.

(Control Device)

Figure 6:
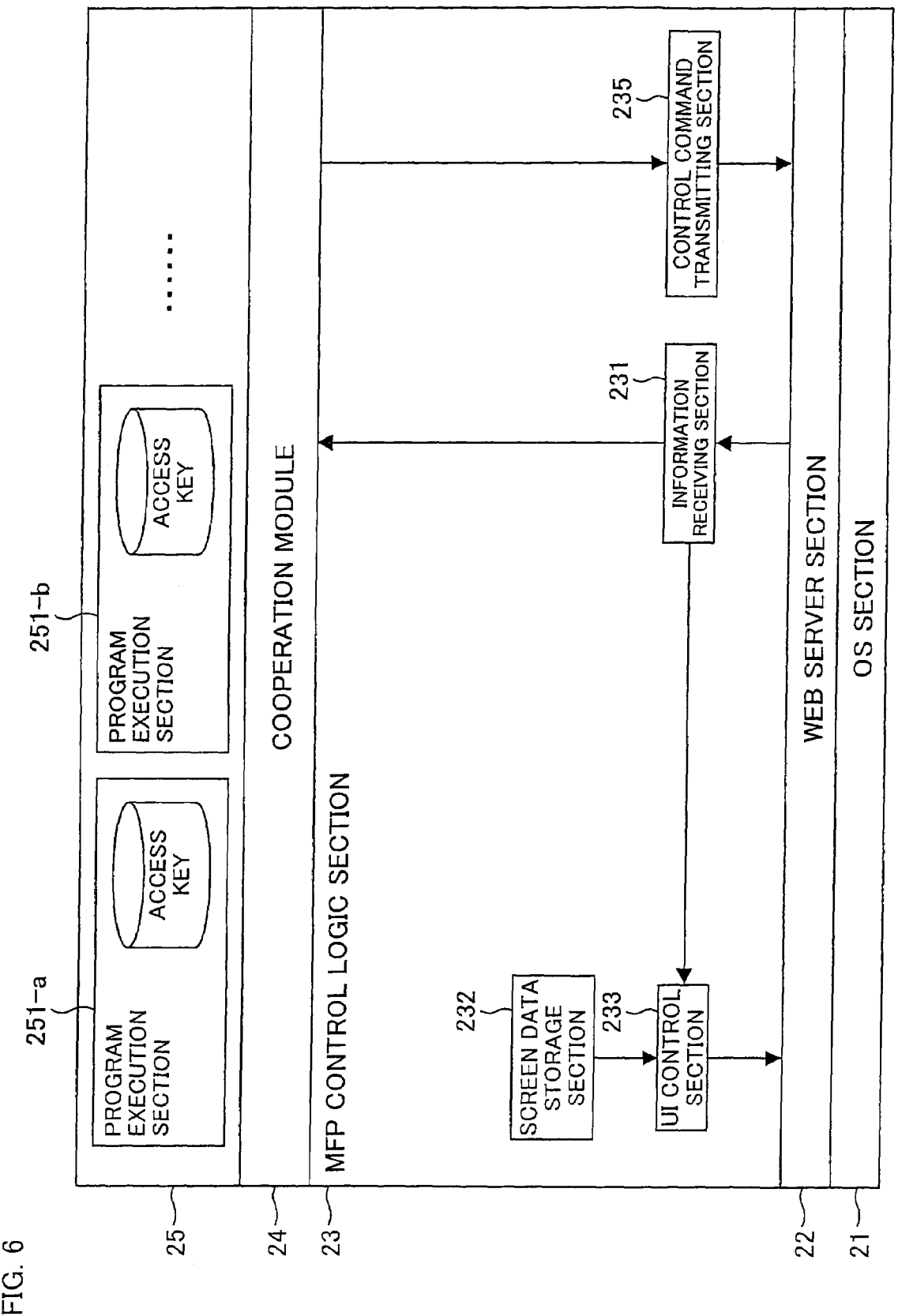
FIG. 6 is a block diagram illustrating a functional arrangement of the control device.

FIG. 6 is a block diagram showing a functional arrangement of the control device 2 of the present embodiment. As shown in FIG. 6, the control device 2 includes an OS section 21, an Web server section 22, an MFP control logic section 23, a cooperation module 24, and an application section 25. These sections are realized by the cooperation of hardware including the control section 130 and the storage section 135 shown in FIG. 5 and software which is programs stored in the storage section 135.

The OS section 21 is a block which controls a computer system and performs processes in accordance with an operation system (OS) that provides a basic user operation environment. Examples of the OS include Windows® and Linux®.

The Web server 22 performs communications based on a protocol such as HTTP (HyperText Transfer Protocol)) (or HTTPS) and SOAP (Simple Object Access Protocol). The Web server section 22 receives an HTTP request from the multifunction device 1, and returns an HTTP response corresponding to the supplied HTTP request. The Web server section 22 is, for example, a block which operates in accordance with software such as Apache.

The MFP control logic section 23 controls the operation screen (UI) of the multifunction device 1 and various functions of the multifunction device 1. The MFP control logic section 23 includes an information receiving section 231, a screen data storage section 232, a UI control section 233, and a control command transmitting section 235.

The screen data storage section 232 stores data of various operation screens that is to be displayed on the operation panel 6 of the multifunction device 1.

In response to an instruction from the information receiving section 231, the UI control section 233 reads out operation screen data from the screen data storage section 232 and supplies the data to the multifunction device 1 via the Web server section 22. This supply of the operation screen data from the UI control section 233 to the multifunction device 1 is carried out based on HTTP (or HTTPS).

The control command transmitting section 235 has a function of transmitting the control command received from the application section 25, to the multifunction device 1 via the Web server section 22. The control command transmitting section 235 transmits the control command by using SOAP.

The control commands that the control command transmitting section 235 transmits are for instructing the multifunction device 1 to perform various processes that the multifunction device 1 can perform. The multifunction device 1 receives a control command and causes the CUP 101 to execute a program for an operation instructed by the control command. Thereby, the multifunction device 1 performs various functions thereof. Therefore, the control commands that the control command transmitting section 235 transmits to the multifunction device 1 can be referred to as executive instructions to cause the multifunction device 1 to execute programs.

Moreover, the control command transmitting section 235 receives the access key from the application section and transmits access key in addition to the control command.

The information receiving section 231 receives information from the multifunction device 1 via the Web server section 22, and instructs the UI control section 233, or the application section 25 to execute a process based on the information thus received. Examples of the types of the information that the information receiving section 231 receives from the multifunction device 1 include (1) request to transmit operation screen data, (2) request for execution of a application program by the application section 25, (3) a completion notification which is supplied from the multifunction device 1 after a process is executed in the multifunction device 1.

Examples of the operation screen for the request (1) include an process-to-do selection screen which allows the user to select a process to be executed by the multifunction device 1, parameter input screen for process execution, and a login screen for user authentication. Receiving the request (1), the information receiving section 231 instructs the UI control section 233 to send the requested operation screen data.

Moreover, the information receiving section 231 receives push button information as an execution request (2). The push button information indicates pressing of execution buttons for instructing the executions of various device functions. Examples of the push button information includes: information of pressing of a button for instructing to start execution of a scanning operation application program that instructs the multifunction device 1 to store a scanned image; information of pressing a button for instructing to start execution of an English-Japanese translation printing application program that instructs extraction of characters from a scanned image, translation of the extracted characters from English to Japanese, and printing of the translated characters.

Receiving an execution request (2), the information receiving section 231 instructs the application section 25 to execute an application program indicated by the received execution request. The information receiving section 231 stores an execution starting program table that corresponds push button information that would be received from the multifunction device 1, and application programs to be executed in response to the push button information.

Receiving a completion notification (3), the information receiving section 231 transmits the completion notification to the application section 25.

The application section 25 includes program execution sections 251 (251-a, 251-b, ...) performs processes based on various application programs. Each program execution section 251 has a function of executing different application programs. The processes of the program execution sections 251 are performed by execution of the application programs by the CPU 131, the application programs being stored in the storage section 135. The application section 25, for example, include a program execution section 251 for executing a scanning operation application program for controlling the scanning operation, a program execution section 251 for executing an English-Japanese translation printing application program for executing the extraction of characters from a scanned image, the English-Japanese translation of the extracted characters, and printing of the translated characters, and the like program execution section 251.

The application section 25 activates a program execution section 251 that executes an application program specified by the information receiving section 231, thereby executing the program.

In executing the program, the program execution section 251 creates a control command and sends the control command to the control command transmitting section 235, the control command instructing execution of a device function of the multifunction device 1 that is instructed by the program. For example, the control command may be a control command "ScanJobCreate" that instructs to create a job of the "scanning" function of the multifunction device 1, a control command "ExecuteScan" that instructs to perform the "scanning" function of the multifunction device 1, and a control command "ScanJobClose" that instructs to stop the job of the "scanning" function of the multifunction device 1.

Moreover, the program execution section 251 stores an access key provided from a manufacturer of the multifunction device 1, and outputs the stored access key in addition to the control command when outputting the control command.

The cooperation module 24 is a module for connecting the application section 25 and the MFP control logic section 23. By the cooperation modules 24, the instruction from the information receiving section 231 is passed to the application section 25 and the instruction from the application section 25 is passed to the control command transmitting section 235.

(Outline of Functional Arrangement of Multifunction Device)

Figure 7:
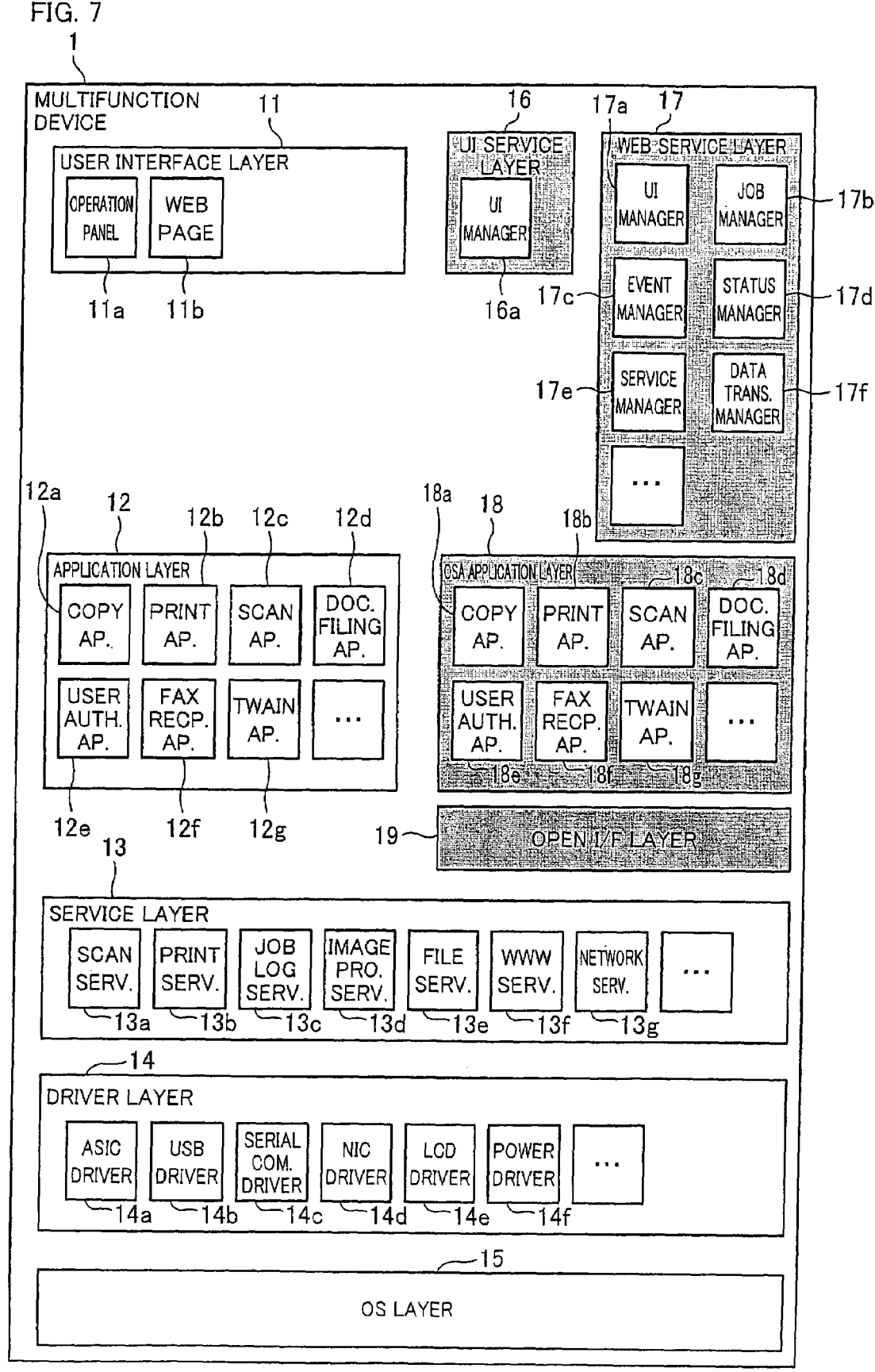
FIG. 7 is a block diagram illustrating a functional arrangement of a multifunction device according to one embodiment.

The following will describe the multifunction device 1. As shown in FIG. 7, the multifunction device 1 includes a user interface layer 11, an application layer 12, a service layer 13, a driver layer 14, an OS layer 15, a UI service layer 16, an Web service layer 17, an OSA application layer 18, and an Open I/F layer 19. These layers and blocks included therein are realized by cooperation of hardware including the control section 100 and the storage section 105 shown in FIG. 3 with software which is programs stored in the storage section 105.

The user interface layer 11 is an interface for allowing the user to operate the multifunction device 1. The user interface layer 11 stores an operation screen (unique operation screen) unique to each type of multifunction device 1, and causes the operation panel 6 to display the unique operation screen. The user inputs to the unique operation screen an instruction to execute a desired function, so as to control the multifunction device 1.

The user interface layer 11 has an operation panel section 11a. The operation panel section 11a sends, to the application layer 12, information having been input to the operation screen of the multifunction device 1.

The user interface layer 11 has an Web page section 11b. The Web page section 11b sends, to the application layer 12, information having been input to a Web page.

The application layer 12 operates in accordance with application programs which perform elemental functions of the multifunction device 1 in cooperation. Examples of the elemental functions include a scanning process which is executed by controlling the document reading section 110 shown in FIG. 3, a printing process which is executed by controlling the image forming section 115, an image processing process based on an application program, and a network process which is executed by controlling the communication section 120. A device function is achieved by combining these elemental functions. In the present embodiment, execution of a device function is instructed by the user.

Examples of a device function in which elemental functions are combined include: a copying process which is a combination of the scanning process, image processing process, and image forming process; image transmitting process which is a combination of the scanning process, image processing process, and network process; printing process which is a combination of the image processing process and the image forming process; and the like. Hereinafter, the following explanation uses the terms "device function" and "elemental function" distinguishably.

The application layer 12 of the present embodiment includes applications such as: a copying application 12a for executing/controlling a copying process which is a device function; a printing application 12b for executing/controlling a printing process; an image transmission application 12c for executing/controlling a process to transmit scanned image data to an external device (i.e. image transmission process); a document filing application 12d for executing/controlling a document filing process; a user authentication application 12e for executing/controlling a user authentication process; a facsimile receiving application 12f for executing/controlling a facsimile receiving process; and a TWAIN application 12g for executing/controlling a TWAIN process.

The service layer 13 is provided below the application layer 12, and controls various elemental functions of the multifunction device 1 in response to instructions from the application layer 12.

The service layer 13 of the present embodiment has services such as: a scanning service 13a for executing a scanning process which is an elemental function; a printing service 13b for executing a printing process; a job log service 13c for performing information management of each job; an image processing service 13d for executing an image formation process such as image generation; a file service 13e for controlling an image management process; a WWW server service 13f for controlling a process for remote access via a Web page; and a network service 13g for controlling a process for communication operations utilizing LAN, telephone lines, or the like.

The driver layer 14 is provided below the service layer 13, and controls the hardware of the multifunction device 1 in order to execute the aforesaid elemental functions. The sections of the service layer 13 operate in accordance with driver programs by which pieces of the hardware of the multifunction device 1 are controlled.

The driver layer 14 of the present embodiment has drivers such as: an ASIC driver 14a related to image formation; a USB driver 14b for performing USB communications; a serial communication driver 14c for performing serial communications; an NIC driver 14d for LAN communications; an LCD driver 14e for controlling image display on the operation panel 6; and a power driver 14f for power management.

The OS layer 15 is provided below the driver layer 14 and constitutes the operating system.

The user interface layer 11, application layer 12, service layer 13, driver layer 14, and OS layer 15 operate in accordance with software unique to each type of the multifunction device 1, and hence these layers are different depending on the type of the multifunction device 1. With these layers, the multifunction device 1 can directly receive instructions from the user without the intermediary of the communications network, and can operate in accordance with the instructions.

In case where the multifunction device 1 have only those unique layers, the control devices 2 which control this multifunction device 1 are required to generate control instructions for each type of multifunction device 1, and this requirement is troublesome. In consideration of this problem, the multifunction device 1 of the present embodiment is provided with the following layers which allow the multifunction device 1 to accept shared control instructions from an external control device 2.

The UI service layer 16 obtains operation-screen data from the control device 2 by means of HTTP (or HTTPS), and causes the operation panel 6 to display an operation screen corresponding to the obtained operation screen data. The UI service layer 16 may function as a general-purpose Web browser.

The UI service layer 16 and the user interface layer 11 allow the user to use a normal operation mode and an open system mode. In the normal operation mode, an operation screen (displayed by the user interface layer 11) unique to the multifunction device 1 is operated so that a function corresponding to the operation is executed by the multifunction device 1. The open system mode uses a network resource (e.g. application of RCD).

The UI service layer 16 is provided with a UI manager 16a which controls how the UI (operation screen) supplied from the control device 2 is displayed.

The UI service layer 16 sends, by means of HTTP (or HTTPS), transmission request information which requests operation screen data, to the control device 2 specified by the address information. The UI manager 16a then instructs the operation panel 6 to display the operation screen based on the operation screen data which has been supplied in response. In this manner, the UI manager functions as UI processing means that receives data of an operation screen from the control device 2 and instructs the operation panel 6 to display the operation screen corresponding to the supplied data.

Also, the UI manager 16a sends, to the control device 2 and by means of HTTP (or HTTPS), push button information which indicates the button having been pushed on the operation screen, obtains new operation data in response to the push button information, and causes the operation panel 6 to display the operation screen corresponding to the data. In short, the UI manager 16a functions as information notification means which notifies the control device 2 of various types of information obtained from the user.

The Web service layer 17 receives a control instruction from the control device 2 by means of SOAP, and calls an appropriate module of the OSA application layer 18, which module corresponds to the control instruction. Also, the Web service layer 17 generates a SOAP command indicating the information supplied from the OSA application layer 18, and sends the SOAP command to the control device 2.

The Web service layer 17 stores control instructions in association with modules of the OSA application layer 18, which modules correspond to the respective types of control indicated by the control instructions. An appropriate module is called in accordance with the stored content.

The Web service layer 17 of the present embodiment includes: a UI manager 17a which processes Web services in regard to UI control; a job manager 17b which deals with Web services in regard to UI control; an event manager 17c for processing Web services in regard of an event transmission request; a status manager 17d for processing Web services in regard of status control of jobs and devices; a service manager 17e for registering information in regard of the OSA application layer 18; a data transmission manager 17f for processing Web services in regard of transmission and reception of job data; and the like.

The OSA application layer 18 is a layer to control the aforesaid cooperated process, and outputs, to the Open I/F layer 19, first APIs which is supplied from the control device 2. As described later, APIs available in (disclosed to) the Open I/F layer 19 do not depend on the type of the multifunction device 1. On this account, the OSA application layer 18 is not required to change the program codes to support different types of multifunction devices 1.

The OSA application layer 18 of the present embodiment includes: a copying application 18a for executing/controlling a copying process; a printing application 18b for executing/controlling a printing process; a scanning application 18c for executing/controlling a function to transmit scanned image data to an external device; a document filing application 18d for executing/controlling a document filing process; a user authentication application 18e for executing/controlling a user authentication process; a facsimile receiving application 18f for executing/controlling a facsimile receiving process; a TWAIN application 18g for executing/controlling a TWAIN process; or the like.

The Open I/F layer 19 discloses, to the OSA application layer 18, first APIs for controlling the service layer 13. The Open I/F layer 19 receives first APIs from the OSA application layer 18, and converts the supplied first APIs into second APIs that the service layer 13 can receive.

The Open I/F layer 19 is provided with a command conversion table storage section (not illustrated) which stores a command conversion table in which first APIs supplied from the OSA application layer 18 are associated with second APIs that are disclosed to the outside by the service layer 13. In accordance with the conversion table, the Open I/F layer 19 calls second APIs that the service layer 13 discloses. FIG. 8 shows an example of the command conversion table stored in the Open I/F layer 19.

In the Open I/F layer 19, the first APIs disclosed to the OSA application layer 18 are shared among all types of the multifunction devices 1. As a result of this, a method which is disclosed to external devices by the Web service layer 17 can be commonly defined irrespective of the types of the multifunction devices 1, without changing the program codes of the OSA application layer 18. In other words, each program execution section of the control device 2 can control the Web service layer 17 by means of a common method, irrespective of the type of the multifunction device 1.

Figure 9:
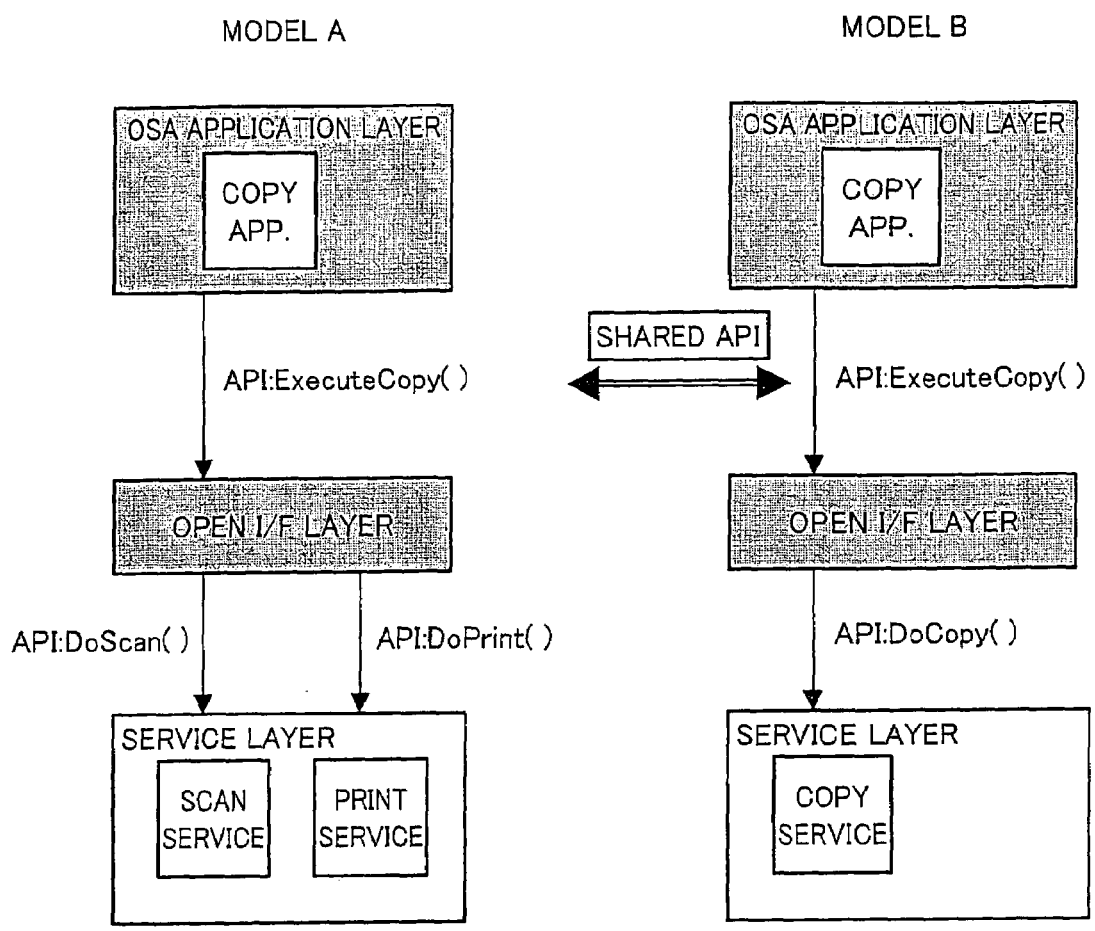
FIG. 9 is a view for explaining functions of the open I/F layer.

FIG. 9 illustrates the functions of the Open I/F layer 19. In this figure, a model-A multifunction device 1 has a scanning service 13a and a printing service 13b, as the service layer 13. In such a case, as a command translation table, the Open I/F layer 19 of the model-A multifunction device 1 stores the first API 'Execute Copy' in association with the second APIs 'Do Scan' and 'Do Print'. Therefore, receiving the first API 'Execute Copy', the Open I/F layer 19 causes the multifunction device 1 to perform the scanning service 13a and printing service 13b in accordance with the second APIs obtained as a result of the conversion.

On the other hand, a model-B multifunction device 1 has a copying service as the service layer 13. In this case, as a command translation table, the Open I/F layer 19 of the model-B multifunction device 1 stores a first API 'Execute Copy' in association with a second API 'Do Copy'. Therefore, receiving the first API 'Execute Copy', the Open I/F layer 19 causes the multifunction device 1 to execute the copying service in accordance with the second API obtained as a result of the conversion.

As described above, the Open I/F layer 19 allows the control devices 2 and the OSA application layer 18 to instruct the execution of the copying using the shared API 'Execute Copy', irrespective of the type of the multifunction device. That is, the control devices 2 and the OSA application layer 18 can instruct the execution of services using shared control instructions and first APIs, even if the service layers are different depending on the type of multifunction device 1. It is therefore unnecessary to use different first APIs corresponding to the respective types of multifunction devices 1, and hence programs for the control devices 2 and the OSA application layer 18 can be easily developed.

(Arrangement of Multifunction Device Regarding Access Authentication)

In the present embodiment, the multifunction device 1 performs the device functions according to the control commands transmitted thereto from the application section 25 of the control device 2 via the communication network. Meanwhile, the use of the communication network is associated with problems of unauthorized access.

The multifunction device 1 would perform a process, such as printing, by a control command given thereto via unauthorized access. For example, the multifunction device 1 would print out a meaningless image on a large number of sheets, or would cause error by performing a process by a control command, a condition of which is not supposed to be set to the multifunction device 1. In view of this, the present embodiment is arranged such that the access key supplied together with the control command is used to perform access authentication process that determines whether or not a sender of the control command sends the control command by an authorized application program. Only if the authentication was successful, the process would be initiated.

Among the device functions of the multifunction device 1, some of them are regarded as main functions, in which the unauthorized authentication would cause wasteful use of paper sheets or error, and the others are regarded as non-main functions such as transmission of status information. The access authentication process would be time consuming if the access authentication process was carried out for the control commands for all the functions.

Therefore, the present embodiment is arranged such that the access authentication process is carried out for particular control commands. In the following, the arrangement of the multifunction device 1 regarding the access authentication process is described referring to FIG. 1.

Figure 1:
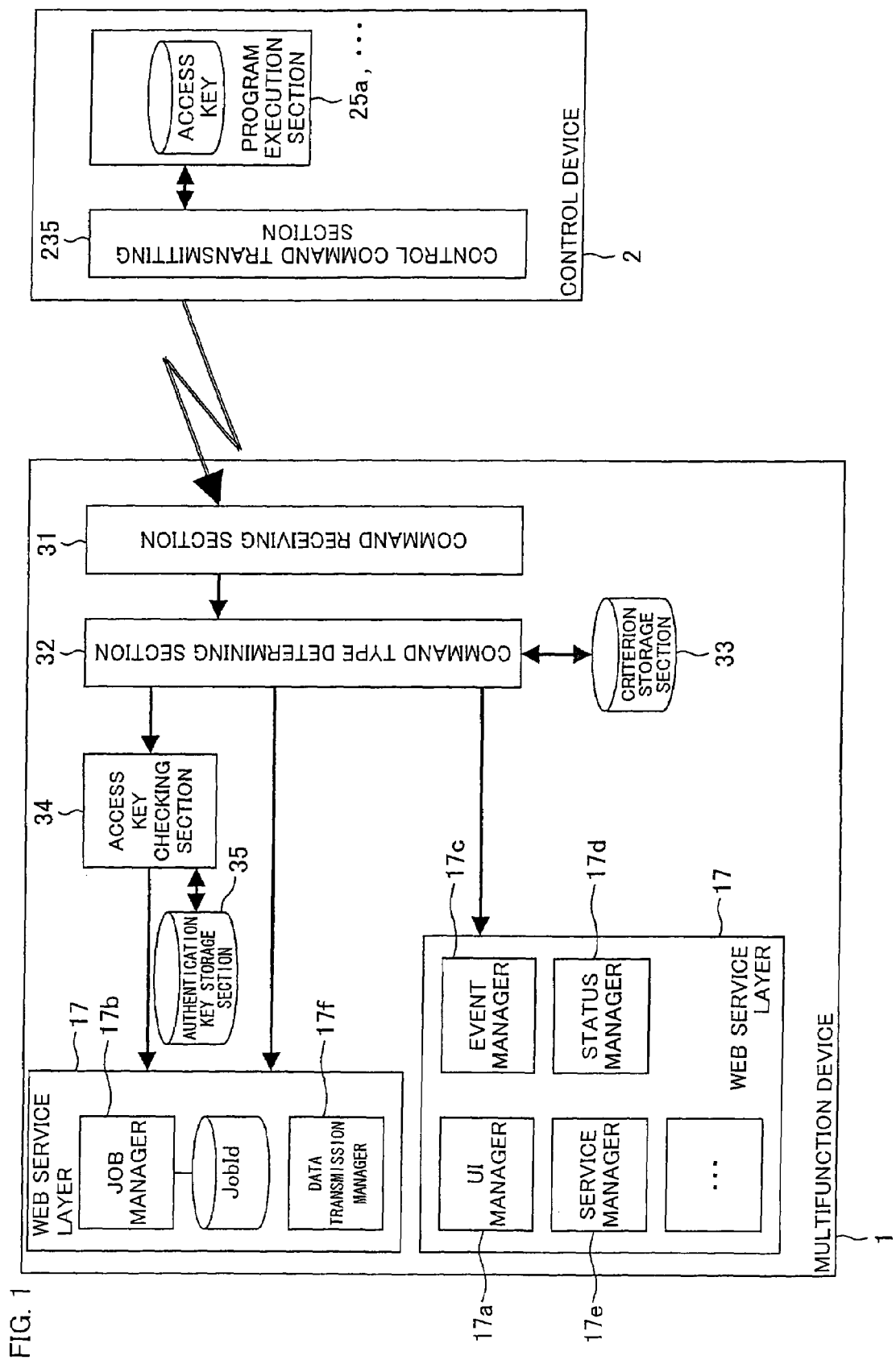
FIG. 1 is a block diagram illustrating an arrangement of a multifunction device regarding an access authentication process, according to an embodiment 1.
Figure 2:
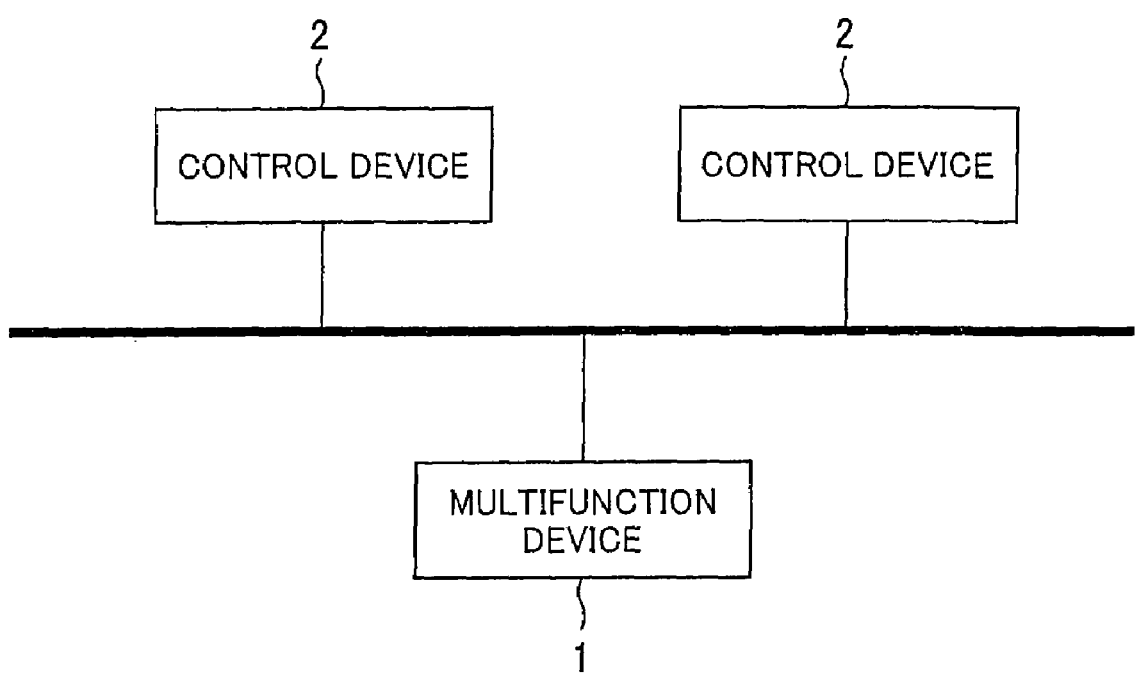
FIG. 2 is a view schematically illustrating an arrangement of a multifunction device control system according to the present embodiment.

As illustrated in FIG. 1, the multifunction device 1 includes a command receiving section 31, a command type determining section 32, a criterion storage section 33, an access key checking section 34, and an authorized key storage section 35.

The command receiving section 31 has a function of receiving the control command from the control section 2 via the communication net work.

The criterion storage section 33 stores a criterion table in which command type information that indicates types of the control commands is associated with information regarding whether the access authentication process is necessary or not for a certain type of the control command. FIG. 10 is a view illustrating one type of the criterion table stored in the criterion storage section 33. As illustrated in FIG. 10, for example, the access authentication process is necessary if the command type information is "creation of scan job", "execution of scan job", etc, meanwhile, the access authentication process is not necessary if the command type information is "change of operation screen", "registration of event", etc.

The command type determining section 32 determines whether the access authentication process is necessary or not for a control command received by the command receiving section 31. From the criterion storage section 33, the command type determining section 32 reads out the information on whether the access authentication process is necessary or not for the type of the control command received by the command receiving section 31. According to the information thus read out, the command type determining section 32 determines whether the access authentication is necessary or not.

The command type determining section 32 outputs the control command to the Web service layer if the access authentication process is not necessary for the control command. On the other hand, the command type determining section 32 outputs the control command to the access key checking section 34 if the access authentication process is necessary for the control command.

The authentication key storage section 35 stores authentication keys that are respectively paired with access keys given to application programs authorized by the manufacturer of the multifunction device 1.

The access key checking section 34 determines whether or not the authentication key paired with the access key sent together with the control command is stored in the authentication key storage section 35. Only if the authentication key paired with the access key is stored in the authentication key storage section 35, the access key checking section 34 outputs the control command to the Web service layer 17.

(Operation of Multifunction Device Control System)

Next, the operation of the multifunction device control system is described. The user can use the normal operation mode and the open system mode in a switching-over manner. In the normal operation mode, an operation screen (displayed by the user interface layer 11) unique to the multifunction device 1 is operated so that a function corresponding to the operation is executed by the multifunction device 1. The open system mode uses a network resource (e.g. application of RCD). The switching-over of the normal operation mode and the open system mode in the multifunction device 1 is carried out when a switching-over button is pushed. Explanation of the operation in the normal operation mode is omitted here, because it is similar to that of a conventional multifunction device.

Figure 11:
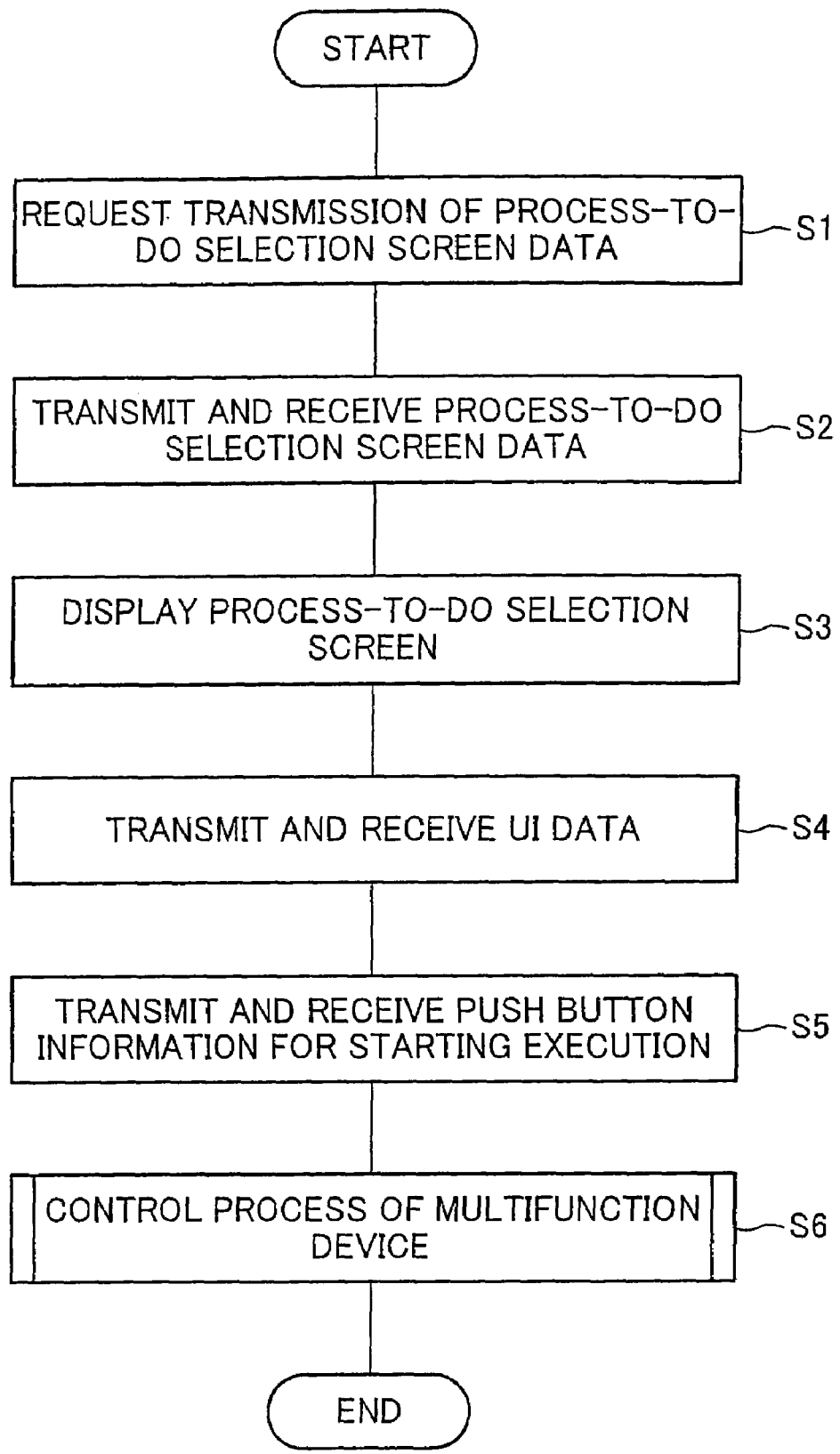
FIG. 11 is a flow chart schematically illustrating operation of a multifunction device control system.

FIG. 11 is a flow diagram schematically illustrating the operation of the multifunction device control system of the present embodiment in the open system mode.

Firstly, the UI service layer of the multifunction device 1 transmits a transmission request to a control device 2 whose address is specified by the user, the transmission request requesting the transmission of process-to-do selection screen data (S1).

In the control device 2 that receives the transmission request, the information receiving section 231 instructs the UI control section 233 to transmit the process-to-do selection screen data that is specified by the transmission request. The UI control section 233 reads out the process-to-do selection screen data from the screen data storage section 232, and transmits the process-to-do selection screen data to the multifunction device 1 (S2).

In the multifunction device 1, the UI service layer 16 receives the process-to-do selection screen data and display the process-to-do selection screen on the operation panel (S3).

In this way, it becomes possible for the user to select a desired cooperation process by pressing an item button for the cooperation process.

When one item button is pushed, the multifunction device 1 and the control device 2 exchange UI data regarding the cooperation process indicated by the pressed item button (S4). Each item button has information that specifies screen data to be displayed next.

The UI service layer 16 transmits, to the control device 2, a transmission request of the screen data that is specified by the pressed item button. In the control device 2, the information receiving section 231 then instructs the US control section 233 to transmit the screen data specified by the transmission request. From the screen data storage section 232, the UI control section 233 reads out the screen data specified by the information receiving section 231. Then, the UI control section 233 transmits to the multifunction device 1 the screen data thus read out. One example of the screen data to be transmitted after the item button is pressed is screen data for an input screen for inputting parameters for the execution of the process selected on the process-to-do selection screen. The transmission and reception of the screen data is realized by using the general-purpose Web browser function of the UI service layer 16 and the Web server function of the UI control section 233. The transmission and reception of the screen data may be repeated plural times. The UI service layer 16 also transmits to the control device 2 the input information (such as parameter values) inputted to the input screen for the parameters. In the control device 2, the input information is temporarily stored in the information receiving section 231.

After that, when an application program execution start button that is provided on the screen of the screen data transmitted from the control device 2 is pushed, the US service layer 16 transmits to the control device 2 push button information that indicates the pushing of the execution start button. Then, the information receiving section 231 of the control device 2 receives the push button information (S5).

From the execution start program table stored in advance, the information receiving section 231 then identifies the application program that corresponds to the push button information received from the multifunction device 1. The information receiving section 231 instructs the application section 25 to execute the thus identified application program. When instructing the execution, the information receiving section 231 sends to the application section 25 the information (such as the parameters for the process execution) temporally stored S4. As described above, the execution start program table associates the push button information that would be received from the multifunction device 1, with the application programs to be executed.

Then, in the application section 25, a program execution section 251 that has a function of executing the application program specified by the information receiving section 231, starts the execution of the program. After that, the control device 2 transmits a control command to the multifunction device 1, and the multifunction device 1 performs a device function instructed by the control command (S6: the control process of the multifunction device). In this manner, the cooperation process performed by the control device 2 and the multifunction device 1 is completed.

Figure 12:
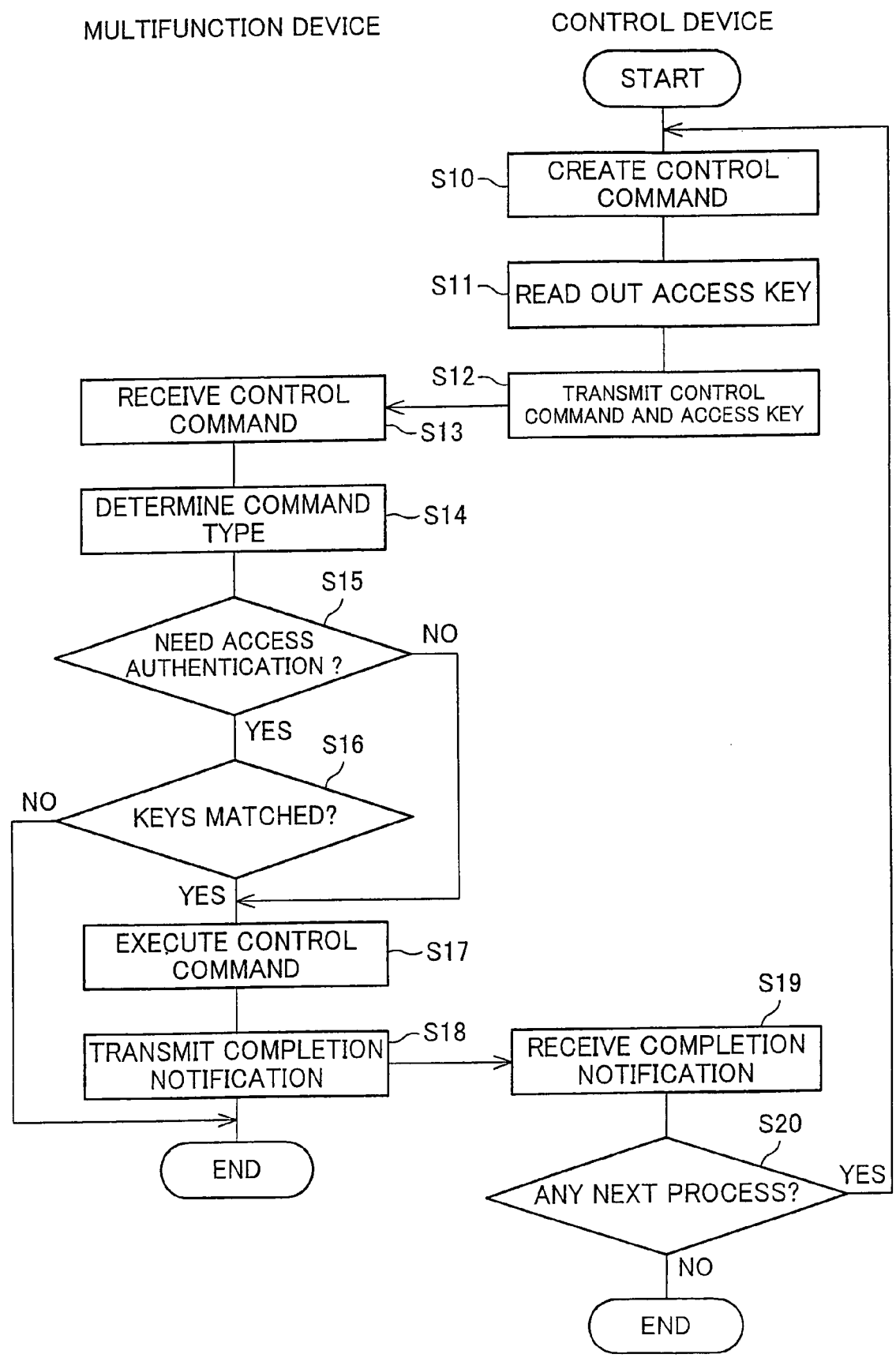
FIG. 12 is a flow chart illustrating a flow of a control process for controlling the multifunction device.

Next, the control process of the multifunction device described at S6 is described referring to the flow chart of FIG. 12.

To being with, the program execution section 251 appropriately creates a control command based on the input information received from the information receiving section 231, and outputs the control command to the control command transmitting section 235 (S10). To the control command to be outputted, the program execution section 251 attaches various data such as image data. For example, a program execution section 251 for executing a translation application outputs image data including translated characters and a control command for instructing execution of printing an image according to the image data.

Moreover, the program execution section 251 reads out the access key stored in advance, and attaches to the control command to be outputted (S11).

After that, the control command transmitting section 235 transmits, to the multifunction device 1, (a) the control command received from the program execution section 251, (b) the access key, and (c) various data (such as image data) (S12).

In the multifunction device 1, the command receiving section 31 receives the control command (S13). From the criterion storage section 33, the command type determining section 32 then reads out information on whether the command type information indicating the type of the received control command is associated with the necessity or non-necessity of the access authentication process (S14). Based on the read-out information, the command type determining section 32 determines whether the access authentication process is necessary or not (S15).

If the access authentication is not necessary ("No" at S15), the command type determining section 32 outputs the control command to the Web service layer. In outputting the control command, the various data received together with the control command is also outputted to the Web server layer by the command type determining section 32 together with the control command.

On the other hand, if the access authentication process is necessary ("Yes" at S15), the command type determining section 32 outputs, to the access key checking section 34, the control command, and the access key and the various data attached to the control command.

The access key checking section 34 determines whether or not the authentication key storage section 35 stores therein an authentication key that is paired with the access key attached to the control command (S16).

If the authentication key paired with the access key is stored in the authentication key storage section 35 ("Yes" at S16), the access key checking section 34 outputs the control command to the Web service layer. In outputting the control command, the access key checking section 34 also outputs, to the Web service layer 17, the various data attached to the control command. The Web service layer 17 issues a call to the OSA application layer 18 that corresponds to the control command, and the OSA application layer 18 executes the device function (S17).

After the device function is completed, the event manager 17c of the Web service layer 17 transmits a completion notification to the control device 2.

In the control device 2, the information receiving section 231 receives the completion notification, and outputs the completion notification to the program execution section 251 that is in activation (S19). The program execution section 251 determines whether or not there is a process to do next (S20). If there is a process to do next, it returns to S10. If there is no process to do next, the process is terminated.

On the other hand, if the authentication key paired with the access key is not stored in the authentication key storage section 35 ("No" at S16), the process is terminated.

As described above, the multifunction device 1 according to the present embodiment and the control device 2 that executes the application program are connected with each other so that the multifunction device 1 and the control device 2 can communicate with each other. The multifunction device 1 and the control device 2 connected as such performs a device function which is an appropriate combination of an appropriate combination of plural elemental functions including a communication function and at least one of an image reading function and an image forming function.

To the control command, an access key is attached. The multifunction device 1 includes the command receiving section (control command receiving means) 31, the criterion storage section 33, the command type determining section (determining means) 32, the access key checking (authentication process means) 34, the Web service layer (process execution means) 17, and the OSA application layer (process execution means) 18. The command receiving section 31 has a function of receiving the control command from the control device 2. The criterion storage section 33 stores the criterion table therein, in which the command type information indicting the types of the control commands is associated with information indicating whether the authentication process is necessary or not. Based on the criterion table, the command type determining section 32 determines whether the authentication process is necessary or not for the control command received by the command receiving section 31. If the command type determining section 32 determines that the authentication process is necessary, the access key checking section 34 determines whether the authentication is successful or not by matching the access key with the authentication key stored in advance. If the authentication is successful, and if it is determined that the authentication process is not necessary, the Web service layer 17 and the OSA application layer 18 execute the process as instructed by the control command.

With this arrangement, the authentication process by matching the access key with the authentication key is performed only if a control command of such a type that the information stored in the criterion storage section 33 requires the authentication process for this type. Here, the conditions stored in the criterion storage section 33 can be arbitrarily set by the manufacturer of the multifunction device 1.

Therefore, the manufacturer of the multifunction device 1 can set such that control commands for executing the image reading function and the image forming function, which are main functions of the multifunction device 1, are control commands of the types that require the authentication process. By this, the authentication process is executed only for such control commands that control the main functions of the multifunction device 1. This prevents problems such as occurrence of errors that would be caused by a control command created by an unauthorized application program. This attains higher security.

On the other hand, the manufacturer of the multifunction device 1 can set such that control commands for controlling the non-main functions of the multifunction device (such as transmission of the status information of the multifunction device, etc.) are control commands that do not require the authentication process. By this, the workload on the multifunction device can be reduced compared with the case where the authentication process is carried out for all the control command.

As described above, this arrangement can attain a multifunction device 1 with higher security and reduced workload thereon.

Moreover, the access key may be predetermined by the manufacturer of the multifunction device 1. By this, the manufacturer of the multifunction device 1 can grasp the application programs, which respectively store authorized access keys. As a result, the manufacturer can charge a fee on a manufacturer of an application program who request for an authorized access key.

Embodiment 2

Another embodiment regarding a multifunction device according to the present invention is described below, referring to FIGS. 13 and 14. For the sake of easy explanation, members having the same functions as the members illustrated in the drawings explained in the embodiment 1 are labeled in the same manner and their explanation is omitted here.

Figure 13:
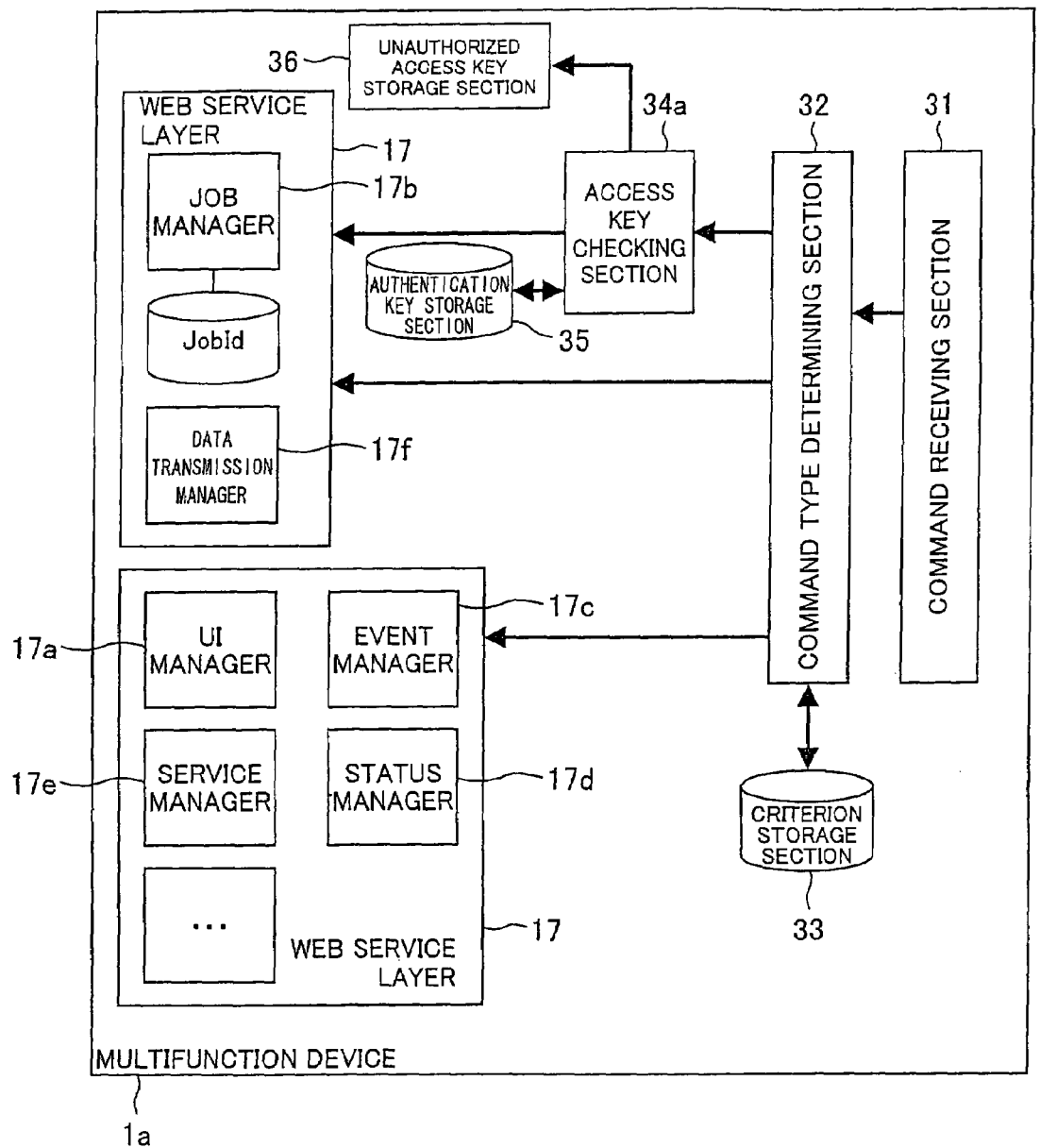
FIG. 13 is a block diagram illustrating an arrangement of a multifunction device regarding an access authentication process, according to an embodiment 2.

FIG. 13 is a block diagram illustrating access authentication of a multifunction device 1a according to the present embodiment. As illustrated in FIG. 13, the multifunction device 1a of the present embodiment includes an access key checking section 34a instead of the access key checking section 34, and further includes an unauthorized access key storage section 36, compared with the embodiment 1.

The access key checking section 34a of the present embodiment has the following function in addition to the function of the access key checking section 34 of the embodiment 1. If an authentication key storage section 35 stores no authentication key that is paired with an access key attached to the control command, the access key checking section 34a stores the access key in the unauthorized access key storage section 36.

Figure 14:
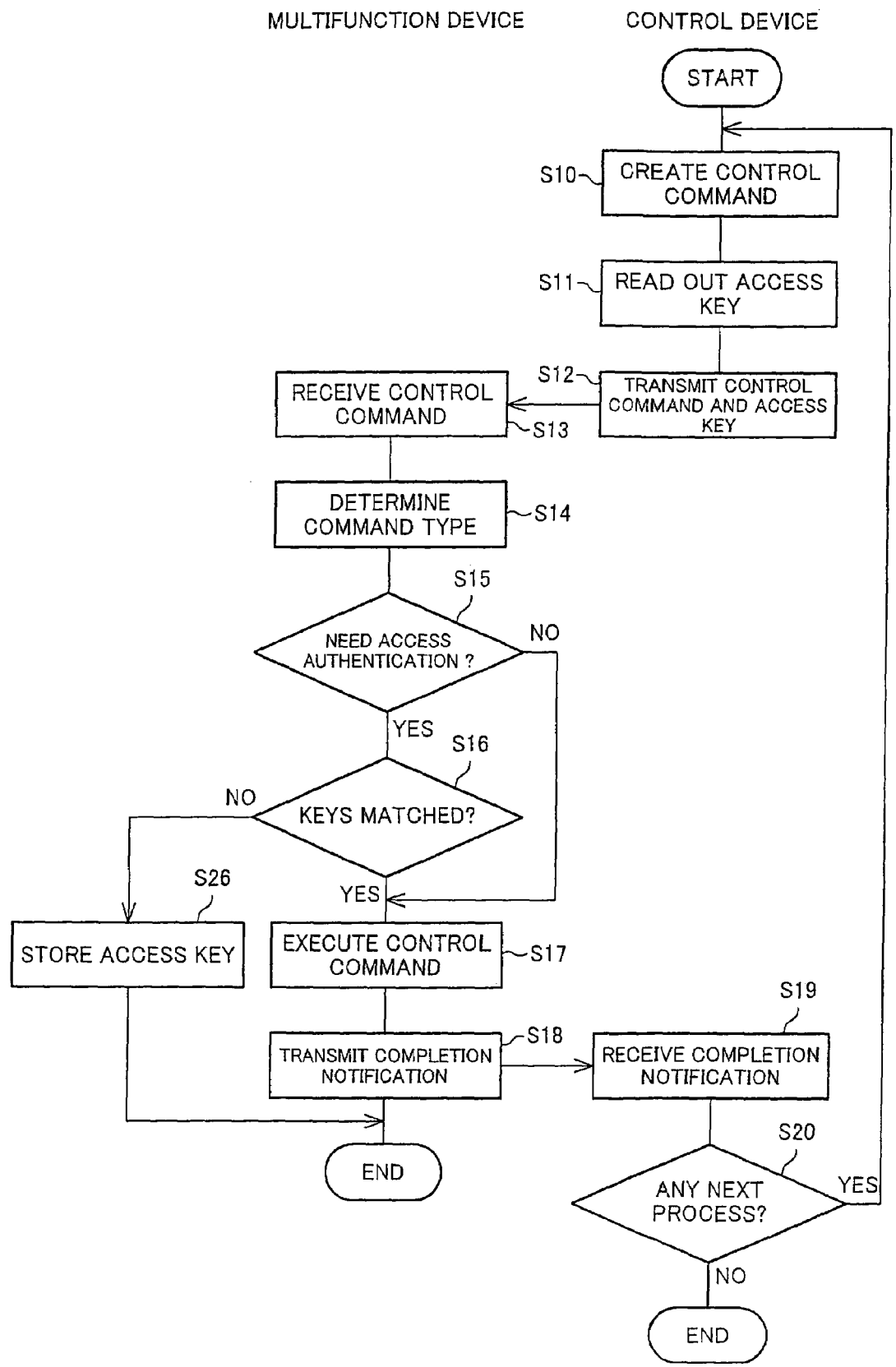
FIG. 14 is a flow chart illustrating a flow of a control process for controlling the multifunction device according to the embodiment 2.

FIG. 14 is a flow chart illustrating a flow of a control process of the multifunction device 1a according to the present embodiment. As illustrated in FIG. 14, the present embodiment is different from the embodiment 1 (as illustrated in FIG. 12) in that S26 is added for the case where the authentication key storage section 35 stores no authentication key that is paired with the access key attached to the control command. At S26, the access key checking section 34a stores the access key in the unauthorized access key storage section 36.

The access key that is not paired with any authentication key stored in the authentication key storage section 35 is an access key created by an application program unauthorized by the manufacturer of the multifunction device 1a. By checking the access key stored in the unauthorized access key storage section 36, it is possible to check the unauthorized access in various points.

Embodiment 3

Still another embodiment regarding a multifunction device according to the present invention is described below, referring to FIGS. 15 and 16. For the sake of easy explanation, members having the same functions as the members illustrated in the drawings explained in the embodiment 1 are labeled in the same manner and their explanation is omitted here.

In the embodiment 1, the access key that is not ciphered is transmitted from the control device 2 to the multifunction device 1. The present embodiment is arranged such that a ciphered access key is transmitted to the multifunction device. Even if the access key is tapped in the communication network, the encryption makes it difficult to find out how the access key is produced.

The present embodiment is arranged such that each program execution section 251 of the control device 2 stores a ciphered access key in advance. The ciphered access key is provided in advance by the manufacturer of the multifunction device.

Figure 15:
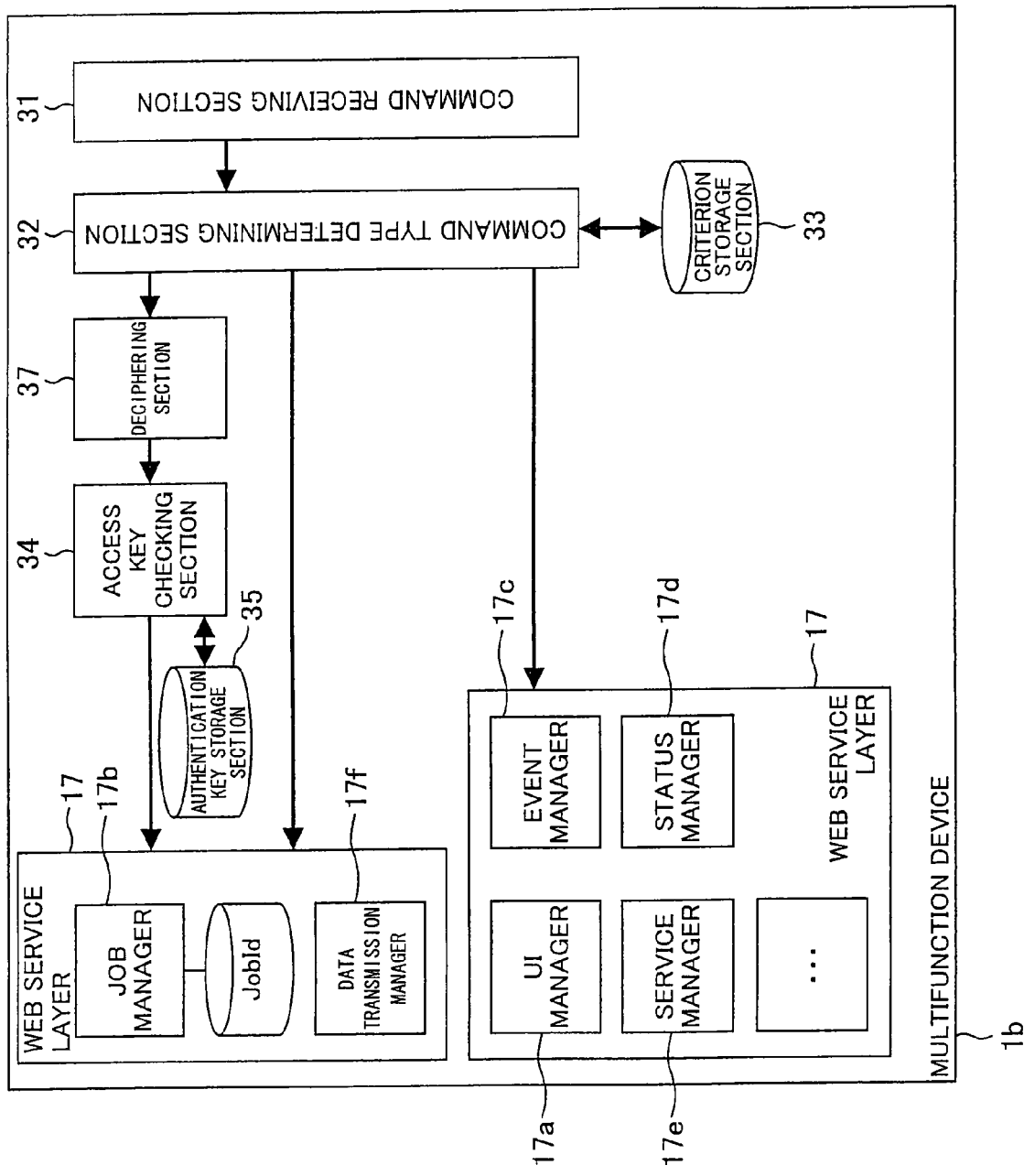
FIG. 15 is a block diagram illustrating an arrangement of a multifunction device regarding an access authentication process, according to an embodiment 3.

FIG. 15 is a block diagram illustrating an arrangement regarding access authentication of the multifunction device 1b according to the present embodiment. As illustrated in FIG. 15, the multifunction device 1b of the present embodiment is different from the embodiment 1 in that the multifunction device 1b includes a deciphering section 37.

The deciphering section 37 performs deciphering process of the ciphered access key. As described above, the ciphered access key is provided in advance by the manufacturer. Thus, the manufacturer can set a deciphering method of the deciphering section 37. The deciphering section 37 deciphers the access key attached to the control command for which access authentication process is necessary according to determination performed by a command type determining section 32. The deciphering section 37 outputs, to an access key checking section 34, (a) the control command, (b) various data attached to the control command, and (c) the deciphered access key.

Figure 16:
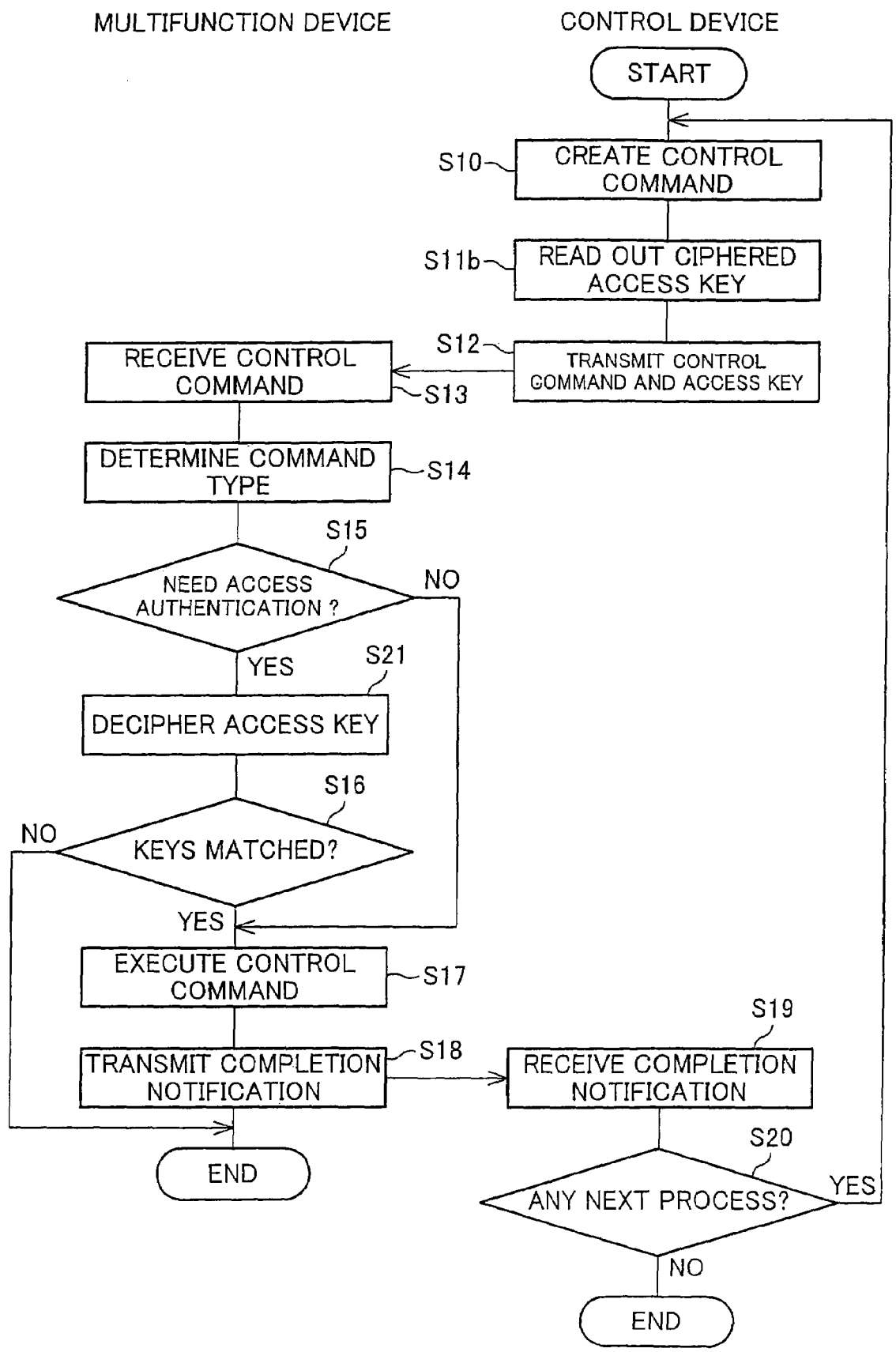
FIG. 16 is a flow chart illustrating a flow of a control process of controlling the multifunction device according to the embodiment 3.

FIG. 16 is a flow chart illustrating a flow of a control process of the multifunction device 1b of the present embodiment. As illustrated in FIG. 16, the present embodiment is different from the embodiment 1 (as illustrated in FIG. 12) in that S11b is performed instead of S11, and S21 is performed after S15.

At S11b, a program execution section 251 reads out the ciphered access key stored in advance, and attaches the ciphered access key to the control command. Moreover, at S21, the deciphering section 37 deciphers the access key attached to the control command.

As described above, the present embodiment is arranged such that the deciphered access key is transmitted in the communication network. The encryption makes it impossible to find out how to create the access key, even if the access key is tapped.

Embodiment 4

In the embodiment 3, the access authentication process is performed in the multifunction device 1b. Such an access authentication process may be performed in an authentication server, which is an external device of the multifunction device. The present embodiment is so arranged that such an authentication server perform the access authentication process. For the sake of easy explanation, members having the same functions as the members illustrated in the drawings explained in the embodiment 3 are labeled in the same manner and their explanation is omitted here.

Figure 17:
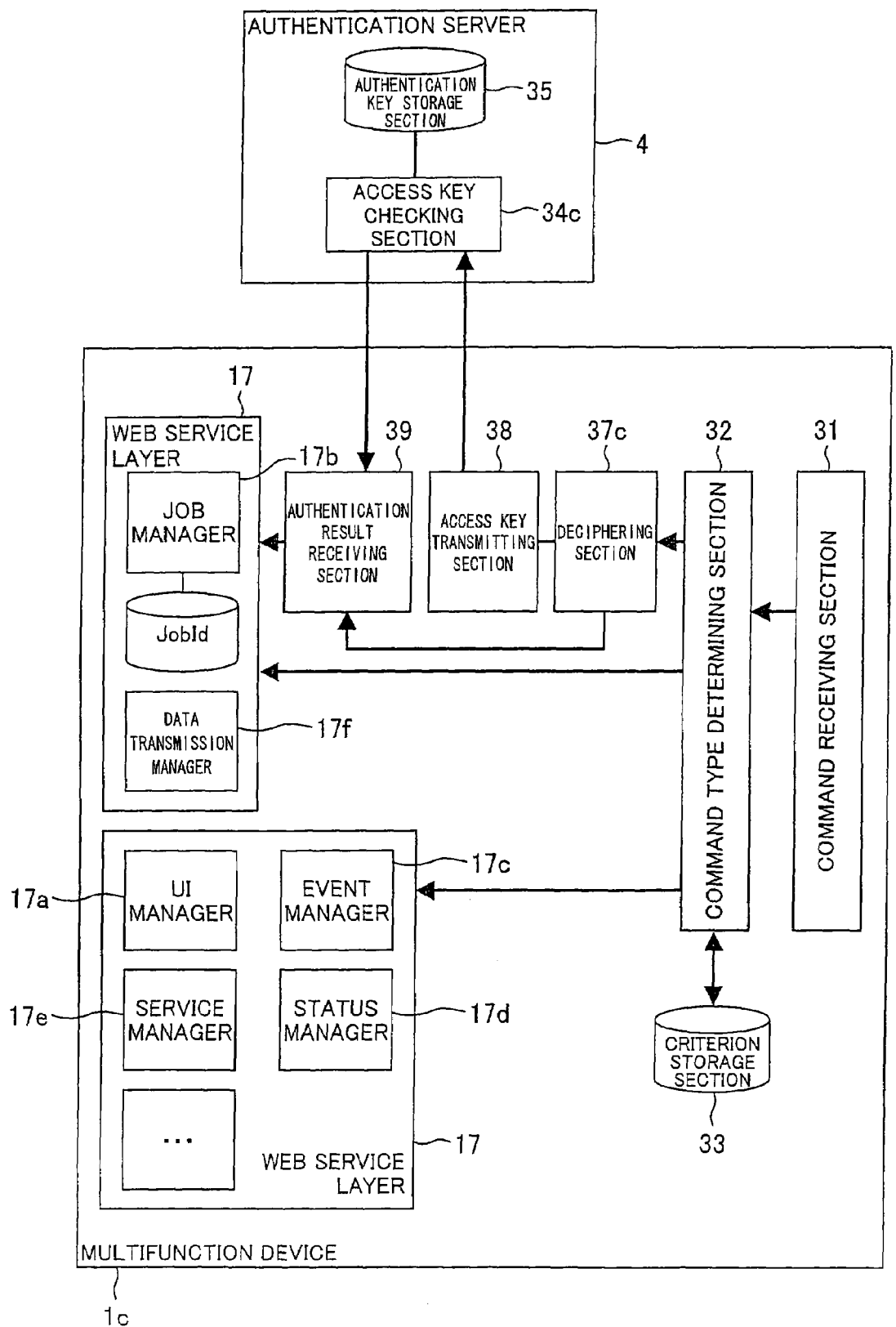
FIG. 17 is a block diagram illustrating an arrangement of a multifunction device regarding an access authentication process, and an arrangement of an authentication server, according to an embodiment 4.

FIG. 17 is a block diagram illustrating an arrangement of a multifunction device 1c and an authentication server 4 according to the present embodiment, regarding the access authentication. In the present embodiment, the multifunction device 1c and the authentication server 4 are connected with each other via a communication network.

The multifunction device 1c is different from the multifunction device 1b of the embodiment 3 in that the multifunction device 1c includes a deciphering section 37c instead of the deciphering section 37, and an access key transmitting section 38 and an authentication result receiving section 39 instead of the access key checking section 34 and the authentication key storage section 35.

The deciphering section 37c is different from the deciphering section 37 in (a) that the deciphering section 37c outputs, to the authentication result receiving section 39, a control command and various data attached to the control command, and (b) that the deciphering section 37c outputs a deciphered access key to the access key transmitting section 38.

The access key transmitting section 38 has a function of transmitting, to the authentication server 4, the access key deciphered by the deciphering section 37c.

The authentication result receiving section 39 has a function of receiving authentication result information from the authentication server 4. The authentication result information indicates a result of the access authentication process. Only if the authentication result information indicates that the authentication is "successful", the authentication result receiving section 39 outputs, to a Web service layer 17, the control command and the various data received from the deciphering section 37c.

Moreover, as illustrated in FIG. 17, the authentication server 4 includes an access key checking section 34c and an authentication key storage section 35.

The access key checking section 34c determines whether or not the authentication key storage section 35 stores therein an authentication key paired with an access key received from the multifunction device 1c. If the authentication key paired with the access key is stored in the authentication key storage section 35, the access key checking section 34c transmits to the multifunction device 1c the authentication result information that indicates "successful authentication". On the other hand, if the authentication key paired with the access key is not stored in the authentication key storage section 35, the access key checking section 34c transmits to the multifunction device 1c the authentication result information that indicates "unsuccessful authentication (authentication error)".

Figure 18:
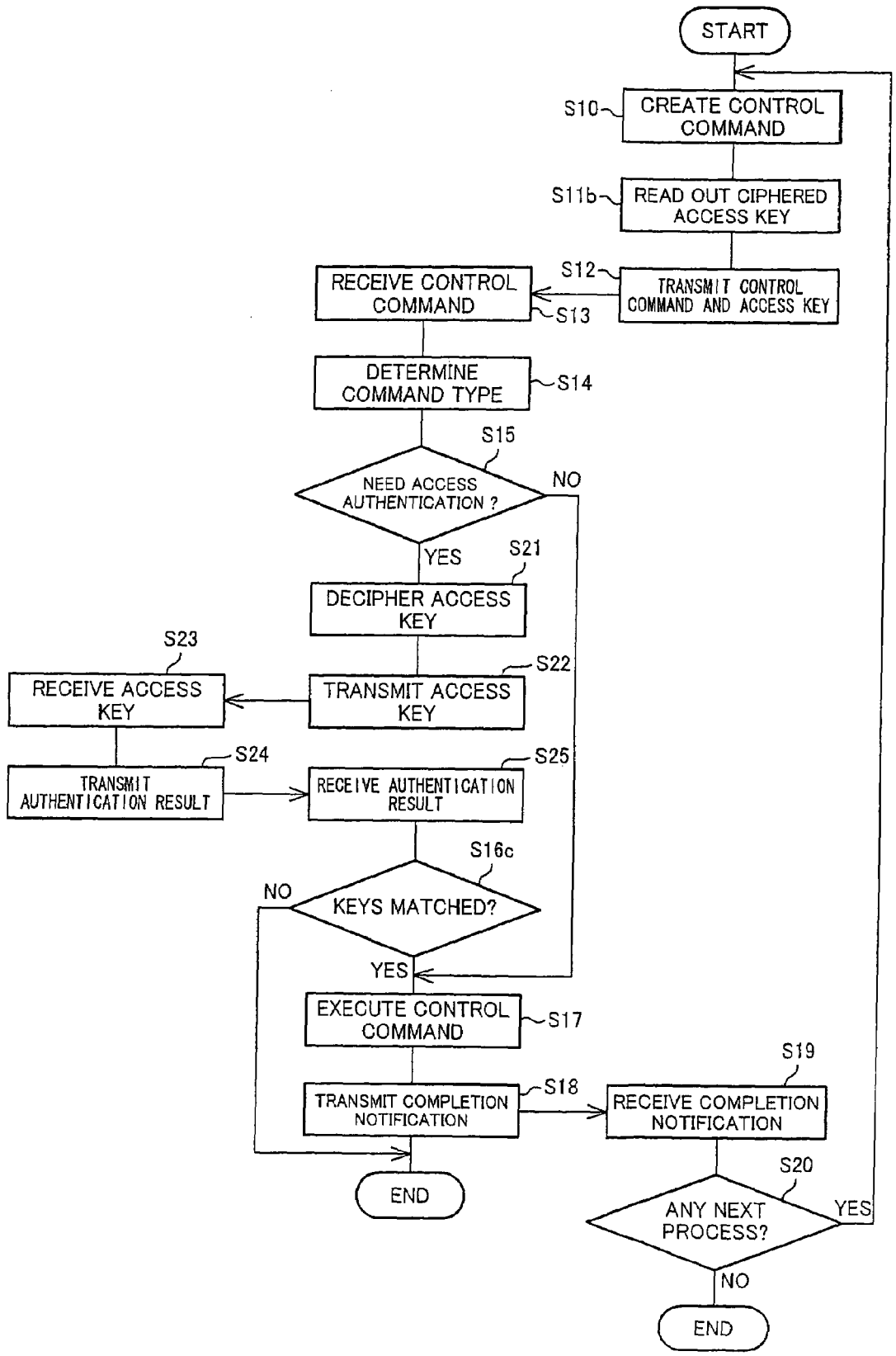
FIG. 18 is a flow chart illustrating a flow of a control process of the multifunction device, according to the embodiment 4.

FIG. 18 is a flowchart illustrating a flow of a control process of the multifunction device 1c according to the present embodiment. As illustrated in FIG. 18, the present embodiment is different from the embodiment 3 (illustrated in FIG. 16) in (a) that S22 to S25 are performed after S21, and (b) that S16c is performed instead of S16.

At S22, the access key transmitting section 38 transmits, to the authentication server 4, the access key deciphered by the deciphering section 37c. Then, the access key checking section 34c of the authentication server 4 receives the access key from the multifunction device 1c (S23).

Next, in the authentication server 4, the access key checking section 34c determines whether or not the authentication key storage section 35 stores therein an authentication key paired with an access key received from the multifunction device 1c. Then, the access key checking section 34c creates the authentication result information according to the result of the determination. After that, the access key checking section 34c transmits the created authentication result information to the multifunction device 1c (S24). Then, in the multifunction device 1c, the authentication result receiving section 39 receives the authentication result information (S25).

After that the authentication result receiving section 39 determines whether or not the authentication result information indicates "successful authentication" (S16c). If the authentication result information indicates "successful authentication", the operation goes to S17. If the authentication result information indicates "unsuccessful authentication", the operation is terminated.

As described above, the multifunction device 1c of the present embodiment is connected with the authentication server 4 so that the multifunction device 1c and the authentication server 4 can communicate with each other. The multifunction device 1c includes the access key transmitting section (authentication result information obtaining means) 38, the authentication result receiving section (authentication result information obtaining means) 39, the Web service layer (process execution means) 17, and OSA application layer (process execution means) 18. If the command type determining section 32 determines that the authentication process is necessary, the access key transmitting section 38 transmits, to the authentication server 4, the access key attached to the control command. The authentication result receiving section 39 then receives the authentication result information from the authentication server. If the authentication result information indicates that the authentication is successful or if it is determined that the authentication process is not necessary, the process as instructed by the control command is performed by the Web service layer (process execution means) 17, and OSA application layer (process execution means) 18.

In this arrangement, the multifunction device 1c does not need to store the authentication key therein. In case a new key is provided for a new application program, it is required to store a new authentication key in the authentication key storage section 35 of the authentication server 4, but not to update the authentication keys in all multifunction devices.

Embodiment 5

Still yet another embodiment of a multifunction device of the present invention is described below, referring to FIGS. 19 and 20. For the sake of easy explanation, members having the same functions as the members illustrated in the drawings explained in the embodiment 1 are labeled in the same manner and their explanation is omitted here.

In the present embodiment, an access key includes an application name that identifies an application program, and usage frequency for each application program is counted according to the application names.

Each program execution section of the control device 2 stores an access key in advance, which includes an application name that identifies an application program to be executed thereby. For example, each program execution section stores such an access key that is xx123456789 ["application name"]. In this case, first eleven digits of the access key is for use in the access authentication process, and an authentication key paired with the access key is xx123456789.

Figure 19:
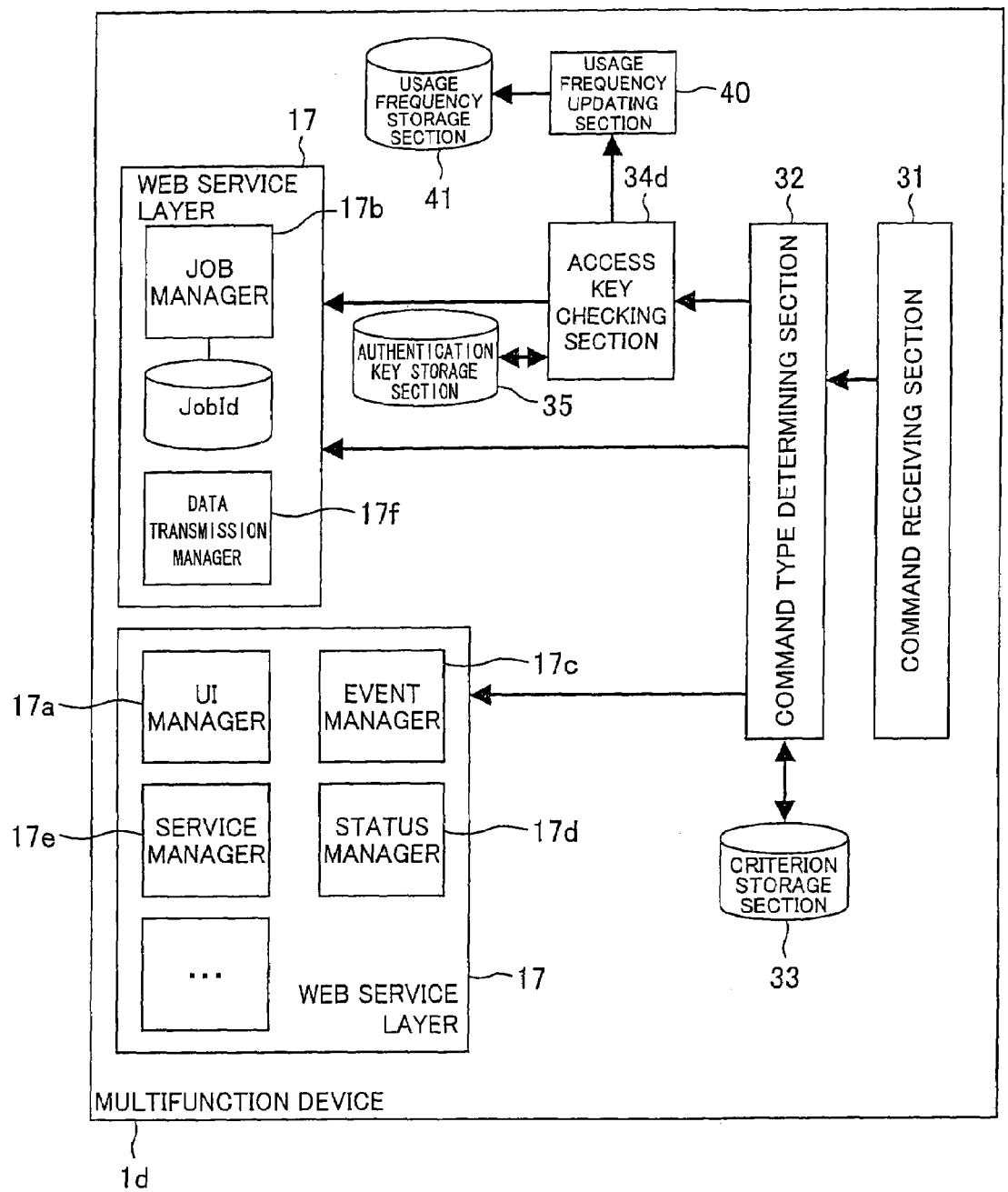
FIG. 19 is a block diagram illustrating an arrangement of a multifunction device regarding an access authentication process, according to an embodiment 5.

FIG. 19 is a block diagram illustrating an arrangement of the multifunction device 1d according to the present invention, regarding the access authentication. As illustrated in FIG. 18, the multifunction device 1d of the present embodiment is different from the embodiment 1 in that the multifunction device 1d includes an access key checking section 34d instead of the access key checking section 34, and further includes a usage frequency updating section 40 and a usage frequency storage section 41.

The access key checking section 34d determines whether an authentication key storage section 35 stores therein an authentication key that is paired with an access key received from the command type determining section 32. Here, the access key includes an application name. Thus, the access key checking section 34d matches the authentication key with the part of the access key excluding the application name. Only if the authentication key storage section 35 stores the authentication key paired with the access key, the access key checking section 34d outputs the control command to the Web service layer 17. The access key checking section 34d also outputs, to the usage frequency updating section 40, (a) the application name extracted from the access key, and (b) the control command.

The usage frequency storage section 41 has a function of storing therein usage frequencies of device functions of the multifunction device 1d (counts of the use of the device functions) per application name. The device functions are, for example, copying, scanning, faxing, and printing. FIG. 20 illustrates an example of information stored in the usage frequency storage section 41.

In FIG. 20, the document administration application is an application that has (i) a scanning function for storing, in a resource on a communication network, an image data scanned by the multifunction device 1d, (ii) a printing function for obtaining data stored in the resource on the communication network and causing the multifunction device 1d to print out the data, (iii) a faxing function for obtaining data stored in the resource on the communication network and causing the multifunction device 1d to fax the data. Control commands that the document administration application would create are "execution of a scan job", "execution of a print job", and "execution of fax transmission"

On the other hand, the map printing application is an application having a printing function for retrieving map information according to map retrieving information inputted via an operation screen of the multifunction device 1d, and causing the multifunction device 1d to print a map based on the map information. A control command that the map printing application would create is "execution of a print job".

According to the control command and the application name received from the access key checking section 34d, the usage frequency updating section 40 updates the usage frequency stored in the usage frequency storage section 41. Specifically, for a control command that instructs execution of a device function such as copying, scanning, faxing, and printing, the usage frequency updating section 40 adds one to the count of the use of the device function by the application name.

In the above explanation, the access key includes the application name. However, instead of the application name, the access key may include identification information that identifies a manufacturer of the application. In this case, the usage frequency storage section 41 stores the usage frequencies per the manufacture of applications.

According to the present embodiment, the manufacturer of the multifunction device 1d can refer to the usage frequencies per application program or manufacturer thereof, stored in the usage frequency storage section 39. This allows the manufacturers of the multifunction device 1d to grasp how the multifunction device 1d is used, and to use the usage frequency to charge fees on the manufacturer of the application.

Embodiment 6

A further embodiment of a multifunction device of the present invention is described below, referring to FIG. 21. For the sake of easy explanation, members having the same functions as the members illustrated in the drawings explained in the embodiment 1 are labeled in the same manner and their explanation is omitted here.

Figure 21:
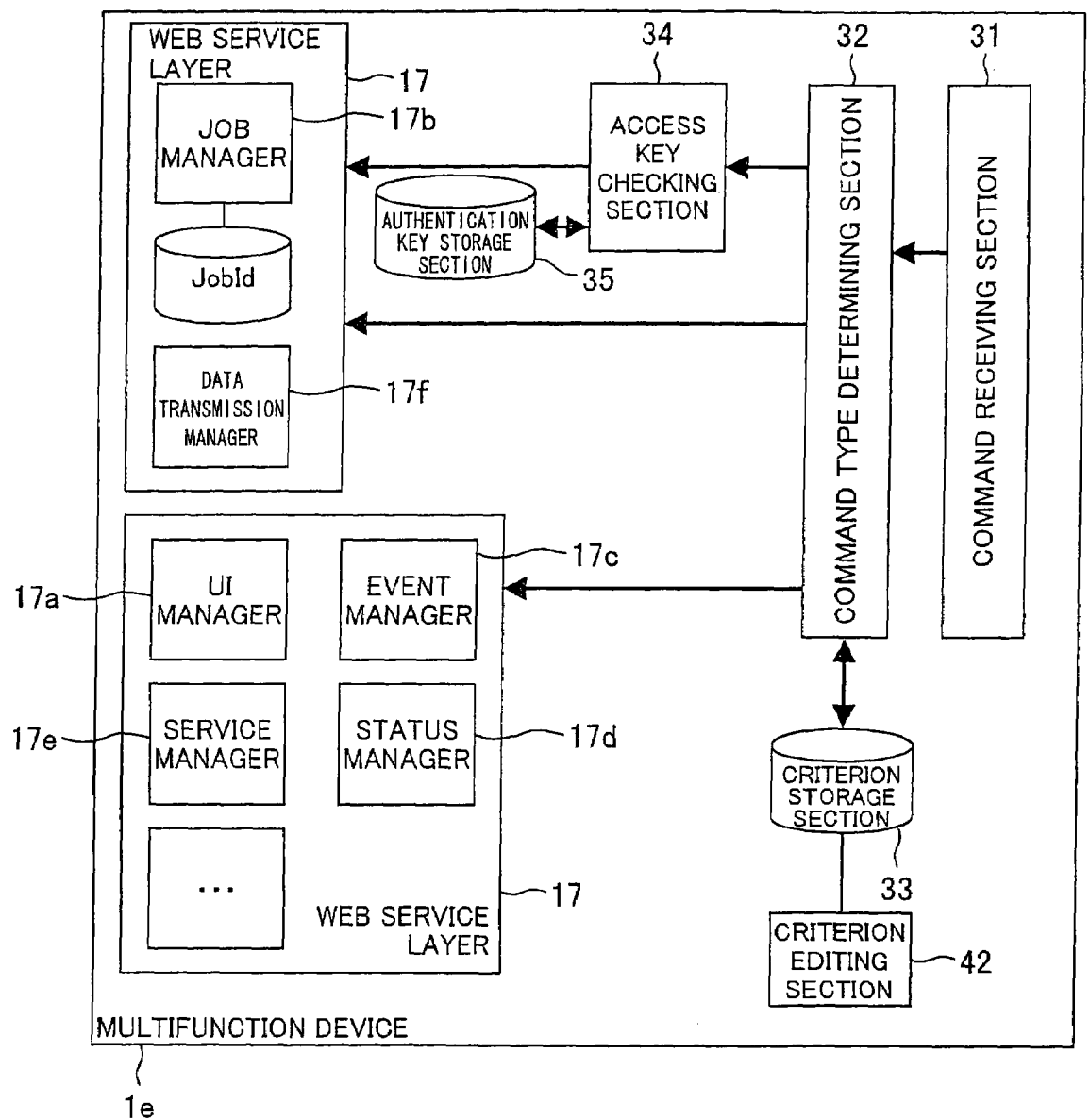
FIG. 21 is a block diagram illustrating an arrangement of a multifunction device regarding an access authentication process, according to an embodiment 6.

FIG. 21 is a block diagram illustrating an arrangement of a multifunction device 1e according to the present embodiment, regarding access authentication. As illustrated in FIG. 21, the multifunction device 1e of the present embodiment is different from the embodiment 1 in that the multifunction device 1e includes a criterion editing section 42.

The criterion editing section 42 has a function of editing a criterion table stored in a criterion storage section 33. More specifically, the criterion editing section 42 changes, according to information inputted via an operation section, whether access authentication process is necessary or not for a control command.

This allows the user to arbitrarily change which control command of device functions of the multifunction device 1e requires the access authentication process.

Embodiment 7

A still further embodiment of a multifunction device according to the present invention is described below, referring to FIGS. 22 and 23. For the sake of easy explanation, members having the same functions as the members illustrated in the drawings explained in the embodiment 1 are labeled in the same manner and their explanation is omitted here.

Figure 22:
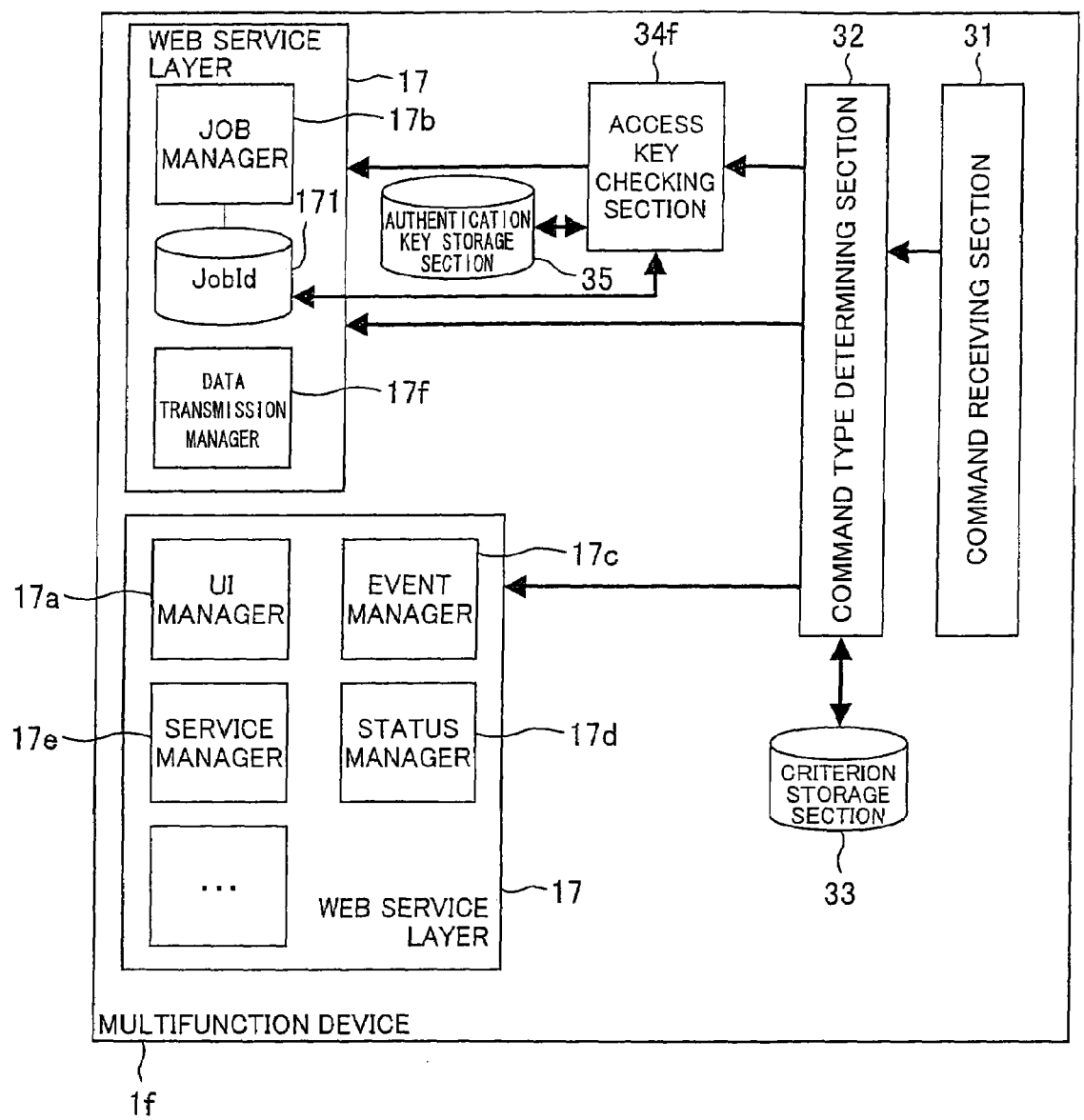
FIG. 22 is a block diagram illustrating a multifunction device regarding an access authentication process, according to an embodiment 7.

FIG. 22 is a block diagram illustrating an arrangement regarding access authentication of a multifunction device 1f according to the present embodiment. As illustrated in FIG. 22, the multifunction device 1f of the present embodiment is different from the embodiment 1 in that the multifunction device 1f includes an access key checking section 34f instead of the access key checking section 34.

The present embodiment is arranged such that, when a job manager 17b of a Web service layer 17 receives a control command for instructing to create a job for a device function (i.e. to prepare for job execution), the job manager 17b creates a job ID for identifying the job instructed by the control command, and stores the job ID in a job ID storage section 171. Further, the job manager 17b transmits, to a control device 2, the thus created job ID with a completion notification that notifies of the completion of the job creation. When the job manager 17b receives a control command for terminating or canceling a specified job, the job manager 17b deletes, from the job ID storage section 171, the job ID created for the specified job.

In the control device 2, an information receiving section 231 receives the completion notification and the job ID, and outputs the completion notification and the job ID to a program execution section 251 that is in activation. With this arrangement, the program execution section 251 can identify the job ID created in the multifunction device 1f. In the present embodiment, the program execution section 251 attaches the job ID to a control command that the program execution section 251 creates after the reception of the job ID. By this, the control command transmitting section 235 transmits the control command and the job ID to the multifunction device 1f.

In addition to the function of the access key checking section 34 in the embodiment 1, the access key checking section 34f in the present embodiment has a function of determining whether or not the job ID attached to the control command is identical with the job ID stored in the job ID storage section 171. If yes, access key checking section 34f outputs the control command to the Web service layer without performing the authentication of an access key with an authentication key.

Figure 23:
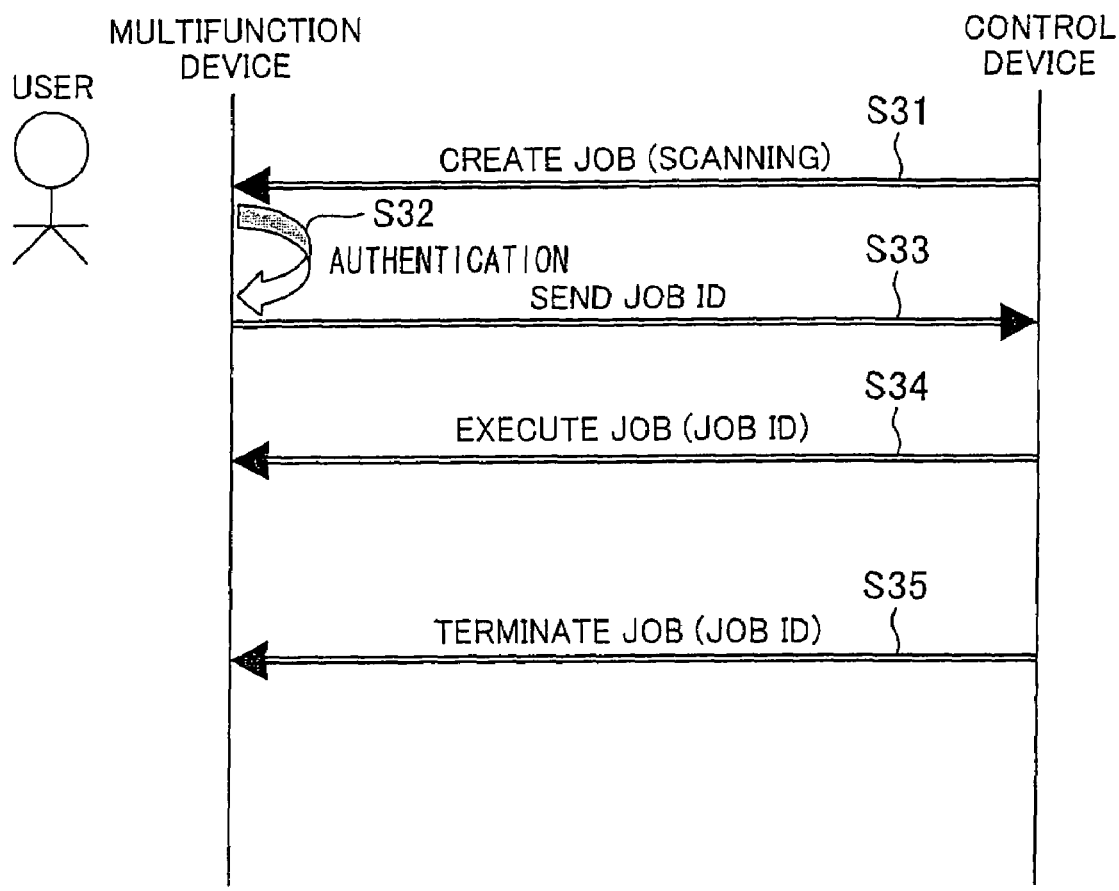
FIG. 23 is a timing chart illustrating data communication between the multifunction device and a control device according to the embodiment 7.

FIG. 23 is a timing chart illustrating data communication between the multifunction device 1f and the control device 2 of the present embodiment. Illustrated in FIG. 23 is the data communication for a case where a program execution section 251 causes a multifunction device 1f to execute a scan job.

To begin with, the program execution section 251 transmits a control command "ScanJobCreate" to the multifunction device 1f (S31). The control command "ScanJobCreate" is to instruct creation of a job for a device function "scanning", and is attached with an access key.

Next, looking up the criterion table as illustrated in FIG. 10, the command type determining section 32 of the multifunction device 1f determines that the access authentication process is necessary. The access key checking section 34f then performs the access authentication process by matching an authentication key with an access key attached to the control command (S32). Here, it is supposed that the authentication key paired with the access key is stored in the authentication key storage section 35.

If the access authentication is successful, the access key checking section 34f outputs the control command to the Web service layer. As instructed by the control command "ScanJobCreate", the job manager 17b of the Web service layer instructs the OSA application layer to carry out a preparation process for the scan job. The job manager 17b also creates a job ID for identifying the scan job, and stores the job ID in the job ID storage section 171. Further, the job manager sends the created job ID and the completion notification of the job creation to the control device 2 (S33).

After that, in the control device 2, the information receiving section 231 outputs, to the program execution section 251 being in activation, the job ID and the completion notification of the job creation that the information receiving section 231 received.

The program execution section 251 stores the job ID received from the information receiving section 231, and attaches the job ID to the control command that is created thereafter. For example, based on input information inputted via the operation section 3 of the multifunction device 1f, the program execution section 251 creates a control command "ExecuteScan" for instructing the execution of the scanning job. As an alternative, based on input information from the multifunction device 1f, the program execution section 251 creates a control command "ScanJobCancel" for instructing to cancel the scanning job.

The program execution section 251 attaches, to the thus created control command (here, "ExecuteScan"), the job ID that the control device received at S33. The program execution section outputs to the control command transmitting section 235 the control command attached with the job ID. Then, the control command transmitting section 235 transmits, to the multifunction device 1f, the control command attached with the job ID (S34).

After receiving the control command, the command type determining section 32 refers to the criterion table as illustrated in FIG. 10, determines that the access authentication process is necessary. In this case, the control command is attached with the job ID. Therefore, the access key checking section 34f checks that the job ID is stored in the job ID storage section 171. Then, the access key checking section 34f skips the access authentication process.

Moreover, after the scanning job is completed, the Web service layer transmits a completion notification of the scanning job execution to the control device 2. Then, the program execution section 251 receives the completion notification and creates a control command "ScanJobClose" for instructing termination of the scanning job. The program execution section 251 attaches, to the thus created control command, the job ID received at S33. Then, the program execution section outputs to the control command transmitting section 235 the control command attached with the job ID. Then, the control command transmitting section 235 transmits, to the multifunction device 1f, the control command attached with the job ID (S35).

After receiving the control command, the command type determining section 32 looks up the criterion table as illustrated in FIG. 10, and determines that the access authentication is necessary. In this case again, the control command is attached with the job ID. Thus, the access key checking section 34f checks that the job ID is stored in the job ID storage section 171. Then, the access key checking section 34f skips the access authentication process.

In case where the control command "ScanJobCancel" is transmitted at S34, the multifunction device 1f can skip the access authentication process because the control command is attached with the job ID.

According to the present embodiment, the number of times the authentication process is performed can be further reduced without scarifying the security of the multifunction device 1f. This further reduces burdens on the multifunction device 1f.

In the explanations on the embodiments, it is put that each program execution section 251 stores the access key. However, the present invention may be arranged such that the MFP control logic section 23 of the control section 2 stores the access key. In this arrangement, the control command transmitting section 235 transmits the control command together with the access key stored in the MFP control logic section 23.

The present invention is not limited to the description of the embodiments above, but may be altered by a skilled person within the scope of the claims. An embodiment based on a proper combination of technical means disclosed in different embodiments is encompassed in the technical scope of the present invention.

For example, the embodiment 4, which is explained as one modification of the embodiment 3, may be one modification of the embodiment 1. That is, each program execution section 251 of the control device 2 may store an access key that is not ciphered, and the access key transmitting section 38 of the multifunction device may transmit the access key received from the control device 2.

Moreover, the embodiment 4 may be arranged to use the job ID so as to skip the authentication process, as in the embodiment 7. In this arrangement, if the job ID attached to the control command received by the command receiving section 31 matches with the job ID stored in the job ID storage section 171, the authentication result receiving section 39 outputs the control command to the Web service layer 17 without requiring the access key transmitting section 38 to transmit the access key to the authentication server.

Moreover, the embodiment 4 may be arranged such that the multifunction device 1c includes a usage frequency storage section 41 and a usage frequency updating section 40. In this arrangement, the access key transmitting section 38 outputs to the authentication server 4 the access key excluding the application name. If the authentication result information indicates "successful authentication, the authentication result receiving section 39 outputs the application name extracted from the access key, and the control command to the usage frequency updating section 40.

The embodiment 4 may be arranged such that the multifunction device 1c includes a criterion editing section 42.

Finally, each block of the multifunction device 1, 1a to 1f, and of the control device 2 may be realized by a hardware logic. However, each block of the multifunction device 1, 1a to 1f, and of the control device 2 is realized by software using the CPUs 101 and 131 as follows in the present embodiment.

Each of The multifunction device 1, 1a to 1f is provided with: the CPU (central processing unit) 101 for executing programs of the blocks; the ROM (read only memory) 107, or HDD (hard disk drive) 108 in which the programs are stored; the RAM (random access memory) 106 for expand the program therein; the storage device (recording medium) 105, such as a memory, for storing the programs and various data; and the like. Meanwhile, the control device is provided with the CPU (central processing unit) 131 for executing programs of the blocks; the ROM (read only memory) 137, or HDD (hard disk drive) 138 in which the programs are stored; the RAM (random access memory) 136 for expand the program therein; the storage device (recording medium) 135 and/or 140, such as a memory, for storing the programs and various data; and the like.

The object of the present invention can be attained by supplying the multifunction device 1 and the control device 2 respectively with recording media in which software to realize the above-mentioned functions is stored in a computer-readable manner, which software is a program code (execution form program, intermediate code program, a source program) for the multifunction device 1 or the control device 2, and then causing a computer (alternatively CPU or MPU) to read out the program code from the recording medium and execute the program code.

Examples of such a recording medium include tape-type media, such as magnetic tapes, cassette tapes and the like; disk type media such as magnetic disks (such as floppy® disks, hard disks, and the like), optical disks (such as CD-ROM, MO, MD, DVD, CD-R, and the like); a card, such as an IC card (inclusive of a memory card), and the other disks; card-type media such as IC cards (encompassing memory cards), optical cards, and the like); semiconductor memories such as mask ROM, EPROM (Erasable Programmable Read Only Memory), EEPROM (Electrically Erasable Programmable Read Only Memory), and flash ROM; and the other media.

A control device and any one of the multifunction device 1, 1a to 1f may be connected to a communication network so that the program code is supplied via the communication network. Examples of the communication network encompass: Internet, Intranet, Extranet, LAN, ISDN, VAN, CATV communication network, virtual private network, telephone lines, mobile communication network, satellite communication networks, and the like. There is no particular limitation as to communication media to constitute the communication network. For example, the communication medium may be a wired communication medium such as IEEE1394, USB, power line transmission, cable TV lines, telephone lines, ADSL lines, or a wireless communication medium such as infrared ray such as IrDA or remote control, Bluetooth®, 802.11 wireless, HDR, mobile telephone network, satellite network, terrestrial digital net, and the like communication media. The present invention can be realized in a form of computer data signal embedded in a carrier wave, by which the program code is concreted as electronic transmission.

As described above, a multifunction device according to the present invention is communicatably connected with a control device for executing an application program, the multifunction device performing a device function according to a control command created by the application program, the device function being an appropriate combination of plural elemental functions including a communication function and at least one of an image reading function and an image forming function, wherein: the control command is attached with an access key; and the multifunction device comprises: a control command receiving means for receiving the control command from the control device; a criterion storage section for storing criterion in which command type information indicating control command types is associated with information indicating whether an authentication process is necessary or not; a determining means for determining, by using the criterion, whether the authentication process is necessary or not for the control command received by the control command receiving means; an authentication process means for performing the authentication process by matching the access key with an authentication key stored in advance, the authentication process means performing the authentication process if the determining means determines that the authentication process is necessary; and a process execution means for executing a process as instructed by the control command, the process execution means performing the process if the authentication process means determines that authentication is successful, or if the determining means determines that the authentication process is not necessary.

Moreover, a method according to the present invention is a method of controlling a multifunction device being communicatably connected with a control device for executing an application program, the multifunction device performing a device function according to a control command created by the application program, the device function being an appropriate combination of plural elemental functions including a communication function and at least one of an image reading function and an image forming function, wherein: the control command is attached with an access key; the multifunction device comprises: a criterion storage section for storing criterion in which command type information indicating control command types is associated with information indicating whether an authentication process is necessary or not; the method comprises: control command receiving means of the multifunction device receiving the control command from the control device; determining means of the multifunction device determining whether the authentication process is necessary or not for the control command received by the control command receiving means; authentication process means of the multifunction device performing the authentication process by matching the access key with an authentication key stored in advance, the authentication process means performing the authentication process if the determining means determines that the authentication process is necessary; and process execution means of the multifunction device executing a process as instructed by the control command, the process execution means performing the process if the authentication process means determines that authentication is successful, or if the determining means determines that the authentication process is not necessary.

As an alternative, a multifunction device according to the present invention is communicatably connected with (i) a control device for executing an application program, and (ii) an authentication server, the multifunction device performing a device function according to a control command created by the application program, the device function being an appropriate combination of plural elemental functions including a communication function and at least one of an image reading function and an image forming function, wherein: the control command is attached with an access key; the authentication server performs an authentication process by matching the access key with an authentication key stored in advance, and outputs authentication result information that indicates a result of the authentication process; and the multifunction device comprises: a control command receiving means for receiving the control command from an external device; a criterion storage section for storing criterion in which command type information indicating control command types is associated with information indicating whether an authentication process is necessary or not; a determining means for determining, by using the criterion, whether the authentication process is necessary or not for the control command received by the control command receiving means; an authentication result information obtaining means for transmitting the access key attached to the control command, to the authentication server if the determining means determines that the authentication process is necessary, and obtaining the authentication result information from the authentication server; and process execution means for executing a process as instructed by the control command, the process execution means performing the process if the authentication result information obtained by the authentication result information obtaining means indicates that authentication is successful, or if the determining means determines that the authentication process is not necessary.

Moreover, a method of the present invention is a method of controlling a multifunction device being communicatably connected with (i) a control device for executing an application program, and (ii) an authentication server, the multifunction device performing a device function according to a control command created by the application program, the device function being an appropriate combination of plural elemental functions including a communication function and at least one of an image reading function and an image forming function, the control command is attached with an access key; and the authentication server performs an authentication process by matching the access key with an authentication key stored in advance, and outputs authentication result information that indicates a result of the authentication process; the multifunction device comprises: a criterion storage section for storing criterion in which command type information indicating control command types is associated with information indicating whether an authentication process is necessary or not; the method comprising: control command receiving means of the multifunction device receiving the control command from an external device; determining means of the multifunction device determining, by using the criterion, whether the authentication process is necessary or not for the control command received by the control command receiving means; authentication result information obtaining means of the multifunction device transmitting the access key attached to the control command, to the authentication server if the determining means determines that the authentication process is necessary, and obtaining the authentication result information from the authentication server; and process execution means of the multifunction device executing a process as instructed by the control command, the process execution means performing the process if the authentication result information obtained by the authentication result information obtaining means indicates that authentication is successful, or if the determining means determines that the authentication process is not necessary.

In this arrangement, the authentication process by matching the access key with the authentication key is carried out only if a control command of the type that requires the authentication process according to the criterion (determination condition) stored in the criterion storage section. The criterion may be arbitrarily set by a manufacturer of the multifunction device.

By this, the manufacturer of the multifunction device can set a control command for an image reading function and an image forming function, each of which is a main function of the multifunction device as a control of a type that requires the authentication process. This arranges that the authentication process is performed only for the control commands that control the main function of the multifunction device, while this prevents problems such as errors caused by control commands created by unauthorized application programs. This attains a higher security.

On the other hand, the manufacturer of the multifunction device can set such that a control command for controlling a non-main function of the multifunction device such as transmission of status information of the multifunction devices does not require the authentication process. By this, the workload burdened on the multifunction device can be reduced compared with the case where the authentication process is performed for all the control commands.

As described above, the above arrangements attain a multifunction device with a high security and with an ability to perform a process with a workload that is reduced as much as possible.

The access key may be predetermined by the manufacturer of the multifunction device. By this, the manufacturer of the multifunction device can grasp the application programs, which respectively store authorized access keys. As a result, the manufacturer can charge a fee on a manufacturer of an application program who request for an authorized access key.

Moreover in the arrangements where the authentication is performed by the authentication server, the multifunction device does not need to store the authentication key therein. In case a new key is provided for a new application program, it is required to store a new authentication key in the authentication server, but not to update the authentication keys in all multifunction devices.

The multifunction device of the present invention is preferably arranged such that if the authentication process means determines that authentication is not successful, the authentication process means stores, in a storage device, the access key attached to the control command. With this, the manufacturer of the multifunction device can check the storage device in order to monitor for the access key created by an unauthorized program.

Moreover, in addition to the above arrangement, the multifunction device of the present invention is preferably arranged such that the access key is ciphered; the multifunction device comprises deciphering means for performing deciphering of the ciphered access key attached to the control command, the deciphering means performing the deciphering if the determining means determines the authentication process is necessary; and the authentication process means performs the authentication process by using the access key deciphered by the deciphering means.

Furthermore, in addition to the above arrangement, the multifunction device of the present invention is arranged such that the access key is ciphered; the multifunction device comprises deciphering means for performing deciphering of the ciphered access key attached to the control command, the deciphering means performing the deciphering if the determining means determines the authentication process is necessary; and the authentication process means transmits, to the authentication server, the access key deciphered by the deciphering means.

With this arrangement, the ciphered access key is transmitted in the communication network between the control device and the multifunction device. This makes it impossible to recognize the access key even if the access key is tapped. As a result, this makes it impossible to find out how to create the access key.

In addition to the above arrangement, the multifunction device of the present invention is preferably arranged such that the access key includes identification information for identifying (a) the application program that created the control command, or (b) a manufacturer of the application program; the multifunction device comprises: a usage frequency storage section for storing usage frequencies per application program or per manufacturer of the application program; and usage frequency updating means for updating, if the authentication process means determines that the authentication is successful, a usage frequency for the application program or the manufacturer of the application program identified by the identification information included in the access key.

In addition to the above arrangement, the multifunction device of the present invention is preferably arranged such that the access key includes identification information for identifying (a) the application program that created the control command, or (b) a manufacturer of the application program; the multifunction device comprises: a usage frequency storage section for storing usage frequencies per application program or per manufacturer of the application program; and usage frequency updating means for updating, if the authentication result information obtained by the authentication result information obtaining means indicates that the authentication is successful, a usage frequency for the application program or the manufacturer of the application program identified by the identification information included in the access key.

With this arrangement, the manufacturer of the multifunction device can refer to the usage frequencies per application program or manufacturer thereof, stored in the usage frequency storage section. This allows the manufacturers of the multifunction device to grasp how the multifunction device is used, and to use the usage frequency to charge fees on the manufacturer of the application program.

In addition to the above arrangement, the multifunction device of the present invention preferably comprises criterion editing means for editing the criterion stored in the criterion storage section. This arrangement allows the user to set the criterion freely.

In addition to the above arrangement, the multifunction device of the present invention is arranged such that: the control command receiving means receives a series of control commands for controlling the device function; the criterion storage section stores association between (a) type information indicating a type of the control commands and (b) information indicating that the authentication process is necessary; the multifunction device comprises: job identification information transmitting means for transmitting job identification information to the control device if the authentication process means determines that the authentication is successful for a first control command among the control commands, the job identification information identifying a job that is to be controlled by the control commands; and a job identification information storage section for storing the job identification information transmitted from the job identification information transmitting means; the control command receiving means receives a second or later control command together with the access key and the job identification information; if the job identification information is received by the control command receiving means and the job identification information matches with the job identification information stored in the job identification information storage section, the authentication process means does not perform the authentication process.

In addition to the above arrangement, the multifunction device of the present invention is preferably arranged such that the control command receiving means receives a series of control commands for controlling one device function; the criterion storage section stores association between (a) type information indicating a type of the control commands and (b) information indicating that the authentication process is necessary; the multifunction device comprises: job identification information transmitting means for transmitting job identification information to the control device if the authentication process means determines that the authentication is successful for a first control command among the control command, the job identification information identifying a job that is to be controlled by the control commands; a job identification information storage section for storing the job identification information transmitted from the job identification information transmitting means; the control command receiving means receives a second or later control command together with the access key and the job identification information; if the job identification information is received by the control command receiving means and the job identification information matches with the job identification information stored in the job identification information storage section, it is considered that, without transmitting the access key to the authentication server, the authentication result information obtaining means obtains the authentication result information that indicates the authentication is successful.

With this arrangement, the number of times the authentication process is performed can be further reduced without scarifying the security of the multifunction device. This further reduces burdens on the multifunction device.

A multifunction device control system according to the present invention comprises a multifunction device as described above, and a control device for executing an application program and transmitting, to the multifunction device, a control command attached with an access key.

Moreover, a multifunction device control system according to the present invention comprises a multifunction device as described above, a control device for executing an application program and transmitting, to the multifunction device, a control command attached with an access key, and an authentication server for performing an authentication process by matching the access key with an authentication key stored in advance, and (ii) outputting authentication result information that indicates a result of the authentication process.

With this arrangement, the above arrangements attain a multifunction device with a high security and with an ability to perform a process with a workload that is reduced as much as possible.

Each means may be realized by hardware or by causing a computer to execute a program(s). More specifically, a control program according to the present invention is a program to cause a computer to operate as each means of the multifunction device. A recording medium according to the present invention stores the control program therein.

When the control program is executed by a computer, the computer operates as each means of the multifunction device. Therefore, it is possible to attain a system, which, like the multifunction device, controls the functions of the multifunction devices integrally, and flexibly change the functions of the multifunction device.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A multifunction device being communicatably connected with a control device for executing an application program, the multifunction device performing a device function according to a control command created by the application program, the device function being an appropriate combination of plural elemental functions including a communication function and at least one of an image reading function and an image forming function, wherein:
the control command is attached with an access key; and
the multifunction device comprises:
control command receiving means for receiving the control command from the control device;
a criterion storage section for storing criterion in which command type information indicating control command types is associated with information indicating whether an authentication process is necessary or not;
determining means for determining, by using the criterion, whether the authentication process is necessary or not for the control command received by the control command receiving means;
authentication process means for performing the authentication process by matching the access key with an authentication key stored in advance, the authentication process means performing the authentication process if the determining means determines that the authentication process is necessary; and
process execution means for executing a process as instructed by the control command, the process execution means performing the process if the authentication process means determines that authentication is successful, or if the determining means determines that the authentication process is not necessary, further wherein:
the access key includes identification information for identifying (a) the application program that created the control command, or (b) a manufacturer of the application program; and
the multifunction device comprises:
a usage frequency storage section for storing usage frequencies per application program or per manufacturer of the application program; and
usage frequency updating means for updating, if the authentication process means determines that the authentication is successful, a usage frequency for the application program or the manufacturer of the application program identified by the identification information included in the access key.

2. A multifunction device being communicatably connected with (i) a control device for executing an application program, and (ii) an authentication server, the multifunction device performing a device function according to a control command created by the application program, the device function being an appropriate combination of plural elemental functions including a communication function and at least one of an image reading function and an image forming function, wherein:
the control command is attached with an access key;
the authentication server performs an authentication process by matching the access key with an authentication key stored in advance, and outputs authentication result information that indicates a result of the authentication process; and
the multifunction device comprises:
control command receiving means for receiving the control command from an external device;
a criterion storage section for storing criterion in which command type information indicating control command types is associated with information indicating whether an authentication process is necessary or not;
determining means for determining, by using the criterion, whether the authentication process is necessary or not for the control command received by the control command receiving means;
authentication result information obtaining means for transmitting the access key attached to the control command, to the authentication server if the determining means determines that the authentication process is necessary, and obtaining the authentication result information from the authentication server; and
process execution means for executing a process as instructed by the control command, the process execution means performing the process if the authentication result information obtained by the authentication result information obtaining means indicates that authentication is successful, or if the determining means determines that the authentication process is not necessary, wherein:
the access key includes identification information for identifying (a) the application program that created the control command, or (b) a manufacturer of the application program;
the multifunction device comprises:
a usage frequency storage section for storing usage frequencies per application program or per manufacturer of the application program; and
usage frequency updating means for updating, if the authentication result information obtained by the authentication result information obtaining means indicates that the authentication is successful, a usage frequency for the application program or the manufacturer of the application program identified by the identification information included in the access key.

3. The multifunction device as set forth in claim 1, wherein if the authentication process means determines that authentication is not successful, the authentication process means stores, in a storage device, the access key attached to the control command.

4. The multifunction device as set forth in claim 1, wherein:
the access key is ciphered;
the multifunction device comprises deciphering means for performing deciphering of the ciphered access key attached to the control command, the deciphering means performing the deciphering if the determining means determines the authentication process is necessary; and
the authentication process means performs the authentication process by using the access key deciphered by the deciphering means.

5. The multifunction device as set forth in claim 2, wherein:
the access key is ciphered;
the multifunction device comprises deciphering means for performing deciphering of the ciphered access key attached to the control command, the deciphering means performing the deciphering if the determining means determines the authentication process is necessary; and
the authentication result information obtaining means transmits, to the authentication server, the access key deciphered by the deciphering means.

6. The multifunction device as set forth in claim 1, comprising criterion editing means for editing the criterion stored in the criterion storage section.

7. The multifunction device as set forth in claim 2, comprising criterion editing means for editing the criterion stored in the criterion storage section.

8. A multifunction device being communicatably connected with a control device for executing an application program, the multifunction device performing a device function according to a control command created by the application program, the device function being an appropriate combination of plural elemental functions including a communication function and at least one of an image reading function and an image forming function, wherein:
the control command is attached with an access key; and
the multifunction device comprises:
control command receiving means for receiving the control command from the control device:
a criterion storage section for storing criterion in which command type information indicating control command types is associated with information indicating whether an authentication process is necessary or not;
determining means for determining, by using the criterion, whether the authentication process is necessary or not for the control command received by the control command receiving means;
authentication process means for performing the authentication process by matching the access key with an authentication key stored in advance, the authentication process means performing the authentication process if the determining means determines that the authentication process is necessary; and
process execution means for executing a process as instructed by the control command, the process execution means performing the process if the authentication process means determines that authentication is successful, or if the determining means determines that the authentication process is not necessary, further wherein:

the control command receiving means receives a series of control commands for controlling one device function;

the criterion storage section stores association between (a) type information indicating a type of the control commands and (b) information indicating that the authentication process is necessary;

the multifunction device comprises:

job identification information transmitting means for transmitting job identification information to the control device if the authentication process means determines that the authentication is successful for a first control command among the control command, the job identification information identifying a job that is to be controlled by the control commands; and a job identification information storage section for storing the job identification information transmitted from the job identification information transmitting means;

the control command receiving means receives a second or later control command together with the access key and the job identification information;

if the job identification information is received by the control command receiving means and the job identification information matches with the job identification information stored in the job identification information storage section, the authentication process means does not perform the authentication process.

9. A multifunction device being communicatably connected with (i) a control device for executing an application program, and (ii) an authentication server, the multifunction device performing a device function according to a control command created by the application program, the device function being an appropriate combination of plural elemental functions including a communication function and at least one of an image reading function and an image forming function, wherein:

the control command is attached with an access key;

the authentication server performs an authentication process by matching the access key with an authentication key stored in advance, and outputs authentication result information that indicates a result of the authentication process; and the multifunction device comprises:

control command receiving means for receiving the control command from an external device;

a criterion storage section for storing criterion in which command type information indicating control command types is associated with information indicating whether an authentication process is necessary or not;

determining means for determining, by using the criterion, whether the authentication process is necessary or not for the control command received by the control command receiving means;

authentication result information obtaining means for transmitting the access key attached to the control command, to the authentication server if the determining means determines that the authentication process is necessary, and obtaining the authentication result information from the authentication server; and process execution means for executing a process as instructed by the control command, the process execution means performing the process if the authentication result information obtained by the authentication result information obtaining means indicates that authentication is successful, or if the determining means determines that the authentication process is not necessary, wherein:

the control command receiving means receives a series of control commands for controlling one device function;

the criterion storage section stores association between type information indicating a type of the control commands and (b) information indicating that the authentication process is necessary;

the multifunction device comprises:

job identification information transmitting means for transmitting job identification information to the control device if the authentication process means determines that the authentication is successful for a first control command among the control command, the job identification information identifying a job that is to be controlled by the control commands;

a job identification information storage section for storing the job identification information transmitted from the job identification information transmitting means; the control command receiving means receives a second or later control command together with the access key and the job identification information;

if the job identification information is received by the control command receiving means and the job identification information matches with the job identification information stored in the job identification information storage section, it is considered that, without transmitting the access key to the authentication server, the authentication result information obtaining means obtains the authentication result information that indicates the authentication is successful.

10. A method of controlling a multifunction device being communicatably connected with a control device for executing an application program, the multifunction device performing a device function according to a control command created by the application program, the device function being an appropriate combination of plural elemental functions including a communication function and at least one of an image reading function and an image forming function, wherein:

the control command is attached with an access key;

the multifunction device comprises:

a criterion storage section for storing criterion in which command type information indicating control command types is associated with information indicating whether an authentication process is necessary or not;

the method comprises:

control command receiving means of the multifunction device receiving the control command from the control device;

determining means of the multifunction device determining, by using the criterion, whether the authentication process is necessary or not for the control command received by the control command receiving means;

authentication process means of the multifunction device performing the authentication process by matching the access key with an authentication key stored in advance, the authentication process means performing the authentication process if the determining means determines that the authentication process is necessary; and process execution means of the multifunction device executing a process as instructed by the control command, the process execution means performing the process if the authentication process means determines that authentication is successful, or if the determining means determines that the authentication process is not necessary further wherein:

the access key includes identification information for identifying (a) the application program that created the control command, or (b) a manufacturer of the application program; and the multifunction device comprises:

a usage frequency storage section storing usage frequencies per application program or per manufacturer of the application program; and usage frequency updating means updating, if the authentication process means determines that the authentication is successful, a usage frequency for the application program or the manufacturer of the application program identified by the identification information included in the access key.

11. A method of controlling a multifunction device being communicatably connected with (i) a control device for executing an application program, and (ii) an authentication server, the multifunction device performing a device function according to a control command created by the application program, the device function being an appropriate combination of plural elemental functions including a communication function and at least one of an image reading function and an image forming function, the control command is attached with an access key; and the authentication server performs an authentication process by matching the access key with an authentication key stored in advance, and outputs authentication result information that indicates a result of the authentication process;

the multifunction device comprises:

a criterion storage section for storing criterion in which command type information indicating control command types is associated with information indicating whether an authentication process is necessary or not;

the method comprising:

control command receiving means of the multifunction device receiving the control command from an external device;

determining means of the multifunction device determining, by using the criterion, whether the authentication process is necessary or not for the control command received by the control command receiving means;

authentication result information obtaining means of the multifunction device transmitting the access key attached to the control command, to the authentication server if the determining means determines that the authentication process is necessary, and obtaining the authentication result information from the authentication server; and process execution means of the multifunction device executing a process as instructed by the control command, the process execution means performing the process if the authentication result information obtained by the authentication result information obtaining means indicates that authentication is successful, or if the determining means determines that the authentication process is not necessary, wherein:

the access key includes identification information for identifying (a) the application program that created the control command, or (b) a manufacturer of the application program: the multifunction device comprises: a usage frequency storage section for storing usage frequencies per application program or per manufacturer of the application program: and usage frequency updating means for updating, if the authentication result information obtained by the authentication result information obtaining means indicates that the authentication is successful, a usage frequency for the application program or the manufacturer of the application program identified by the identification information included in the access key.

12. A multifunction device control system comprising:

a multifunction device; and a control device, the multifunction device being communicatably connected with the control device, the control device executing an application program, which creates a control command, and transmitting to the multifunction device the control command attached with an access key, the multifunction device performing a device function according to a control command created by the application program, the device function being an appropriate combination of plural elemental functions including a communication function and at least one of an image reading function and an image forming function, the control command being attached with an access key; and the multifunction device comprising:

control command receiving means for receiving the control command from the control device;

a criterion storage section for storing criterion in which command type information indicating control command types is associated with information indicating whether an authentication process is necessary or not;

determining means for determining, by using the criterion, whether the authentication process is necessary or not for the control command received by the control command receiving means;

authentication process means for performing the authentication process by matching the access key with an authentication key stored in advance, the authentication process means performing the authentication process if the determining means determines that the authentication process is necessary; and process execution means for executing a process as instructed by the control command, the process execution means performing the process if the authentication process means determines that authentication is successful, or if the determining means determines that the authentication process is not necessary further wherein:

the access key includes identification information for identifying (a) the application program that created the control command, or (b) a manufacturer of the application program: and the multifunction device comprises:

a usage frequency storage section for storing usage frequencies per application program or per manufacturer of the application program; and usage frequency updating means for updating, if the authentication process means determines that the authentication is successful, a usage frequency for the application program or the manufacturer of the application program identified by the identification information included in the access key.

13. A multifunction device controlling system comprising:
a multifunction device;
a control device; and
an authentication server,
the multifunction device being communicatably connected with the control device, the control device executing an application program, which creates a control command, and transmitting to the multifunction device the control command attached with an access key, the multifunction device performing a device function according to a control command created by the application program, the device function being an appropriate combination of plural elemental functions including a communication function and at least one of an image reading function and an image forming function, the authentication server (i) performing an authentication process by matching the access key with an authentication key stored in advance, and (ii) outputting authentication result information that indicates a result of the authentication process, the control command being attached with an access key;
the multifunction device comprising:
control command receiving means for receiving the control command from an external device;
a criterion storage section for storing criterion in which command type information indicating control command types is associated with information indicating whether an authentication process is necessary or not;
determining means for determining, by using the criterion, whether the authentication process is necessary or not for the control command received by the control command receiving means;
authentication result information obtaining means for transmitting the access key attached to the control command, to the authentication server if the determining means determines that the authentication process is necessary, and obtaining the authentication result information from the authentication server; and
process execution means for executing a process as instructed by the control command, the process execution means performing the process if the authentication result information obtained by the authentication result information obtaining means indicates that authentication is successful, or if the determining means determines that the authentication process is not necessary, wherein:
the access key includes identification information for identifying (a) the application program that created the control command, or (b) a manufacturer of the application program; the multifunction device comprises:
a usage frequency storage section for storing usage frequencies per application program or per manufacturer of the application program; and
usage frequency updating means for updating, if the authentication result information obtained by the authentication result information obtaining means indicates that the authentication is successful, a usage frequency for the application program or the manufacturer of the application program identified by the identification information included in the access key.

14. A computer readable recording medium which stores a program for causing a computer to function as the following means of a multifunction device, the multifunction device being communicatably connected with a control device for executing an application program, the multifunction device performing a device function according to a control command created by the application program, the device function being an appropriate combination of plural elemental functions including a communication function and at least one of an image reading function and an image forming function, the control command being attached with an access key, and
the multifunction device comprising:
control command receiving means for receiving the control command from the control device;
a criterion storage section for storing criterion in which command type information indicating control command types is associated with information indicating whether an authentication process is necessary or not;
determining means for determining, by using the criterion, whether the authentication process is necessary or not for the control command received by the control command receiving means;
authentication process means for performing the authentication process by matching the access key with an authentication key stored in advance, the authentication process means performing the authentication process if the determining means determines that the authentication process is necessary; and
process execution means for executing a process as instructed by the control command, the process execution means performing the process if the authentication process means determines that authentication is successful, or if the determining means determines that the authentication process is not necessary, further wherein:
the access key includes identification information for identifying (a) the application program that created the control command, or (b) a manufacturer of the application program: and the multifunction device comprises:
a usage frequency storage section for storing usage frequencies per application program or per manufacturer of the application program; and
usage frequency updating means for updating, if the authentication process means determines that the authentication is successful, a usage frequency for the application program or the manufacturer of the application program identified by the identification information included in the access key.

15. A computer readable recording medium which stores a program for causing a computer to function as the following means of a multifunction device, the multifunction device being communicatably connected with (i) a control device for executing an application program, and (ii) an authentication server, the multifunction device performing a device function according to a control command created by the application program, the device function being an appropriate combination of plural elemental functions including a communication function and at least one of an image reading function and an image forming function,
the control command being attached with an access key;
the authentication server (i) performing an authentication process by matching the access key with an authentication key stored in advance, and (ii) outputting authentication result information that indicates a result of the authentication process; and
the multifunction device comprising:
control command receiving means for receiving the control command from an external device;
a criterion storage section for storing criterion in which command type information indicating control command types is associated with information indicating whether an authentication process is necessary or not;

determining means for determining, by using the criterion, whether the authentication process is necessary or not for the control command received by the control command receiving means;

authentication result information obtaining means for transmitting the access key attached to the control command, to the authentication server if the determining means determines that the authentication process is necessary, and obtaining the authentication result information from the authentication server; and process execution means for executing a process as instructed by the control command, the process execution means performing the process if the authentication result information obtained by the authentication result information obtaining means indicates that authentication is successful, or if the determining means determines that the authentication process is not necessary, wherein:

the access key includes identification information for identifying (a) the application program that created the control command, or (b) a manufacturer of the application program;

the multifunction device comprises:

a usage frequency storage section for storing usage frequencies per application program or per manufacturer of the application program; and usage frequency updating means for updating, if the authentication result information obtained by the authentication result information obtaining means indicates that the authentication is successful, a usage frequency for the application program or the manufacturer of the application program identified by the identification information included in the access key.

* * * * *